United States Patent
Wang

(10) Patent No.: US 10,713,812 B2
(45) Date of Patent: Jul. 14, 2020

(54) METHOD AND APPARATUS FOR DETERMINING FACIAL POSE ANGLE, AND COMPUTER STORAGE MEDIUM

(71) Applicant: Tencent Technology (Shenzhen) Company Limited, Shenzhen (CN)

(72) Inventor: Chengjie Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 202 days.

(21) Appl. No.: 15/944,656

(22) Filed: Apr. 3, 2018

(65) Prior Publication Data

US 2018/0225842 A1 Aug. 9, 2018

Related U.S. Application Data

(63) Continuation-in-part of application No. PCT/CN2017/070607, filed on Jan. 9, 2017.

(30) Foreign Application Priority Data

Jan. 21, 2016 (CN) .......................... 2016 1 0041938

(51) Int. Cl.
*G06T 7/73* (2017.01)
*G06K 9/00* (2006.01)
(Continued)

(52) U.S. Cl.
CPC ............... *G06T 7/73* (2017.01); *G06F 3/012* (2013.01); *G06K 9/00248* (2013.01);
(Continued)

(58) Field of Classification Search
None
See application file for complete search history.

(56) References Cited

U.S. PATENT DOCUMENTS 8,077,216 B2 * 12/2011 Ishihara ............. H04N 5/23293
348/222.1
9,619,105 B1 * 4/2017 Dal Mutto .......... G06F 3/04815
(Continued)

FOREIGN PATENT DOCUMENTS

CN 102156537 A 8/2011
CN 103558910 A 2/2014
(Continued)

OTHER PUBLICATIONS

Tencent Technology, ISR, PCT/CN2017/070607, Apr. 12, 2017, 2 pgs.
(Continued)

*Primary Examiner* — Kim Y Vu
*Assistant Examiner* — Nathan J Bloom
(74) *Attorney, Agent, or Firm* — Morgan, Lewis & Bockius LLP

(57) ABSTRACT

A method of determining a facial pose angle of a human face within an image is provided. After capturing a first image of the human face, respective coordinates of a predefined set of facial feature points of the human face in the first image are obtained. The predefined set of facial feature points includes an odd number of facial feature points, e.g., at least a first pair of symmetrical facial feature points, a second pair of symmetrical facial feature points, and a first single facial feature point. The predefined set of facial feature points are not coplanar. Next, one or more predefined key values based on the respective coordinates of the predefined set of facial feature points of the human face in the first image are calculated. Finally, a pre-established correspondence table is queried using the one or more predefined key values to determine the facial pose angle of the human face in the first image.

20 Claims, 13 Drawing Sheets

(51) Int. Cl.
*G06K 9/62* (2006.01)
*G06F 3/01* (2006.01)
(52) U.S. Cl.
CPC ..... *G06K 9/00275* (2013.01); *G06K 9/00281* (2013.01); *G06K 9/6202* (2013.01); *G06T 2207/20016* (2013.01); *G06T 2207/30201* (2013.01)

(56) References Cited

U.S. PATENT DOCUMENTS

| | | | |
|---|---|---|---|
| 2003/0108244 A1* | 6/2003 | Li | G06K 9/00228 382/227 |
| 2004/0070565 A1* | 4/2004 | Nayar | G06K 9/4661 345/156 |
| 2007/0076954 A1* | 4/2007 | Terakawa | G06K 9/00248 382/190 |
| 2009/0141947 A1 | 6/2009 | Kyyko et al. | |
| 2017/0116425 A1* | 4/2017 | Chang | G06F 21/62 |

FOREIGN PATENT DOCUMENTS

| | | | |
|---|---|---|---|
| CN | 103605965 A | * | 2/2014 |
| CN | 103605965 A | | 2/2014 |
| JP | 2007241478 A | | 9/2007 |
| JP | 2009245338 A | | 10/2009 |
| KR | 20110123532 A | | 11/2011 |

OTHER PUBLICATIONS

Tencent Technology, Written Opinion, PCT/CN2017/070607, dated Apr. 12, 2017, 6 pgs.
Tencent Technology, IPRP, PCT/CN2017/070607, Jul. 24, 2018 7 pgs.

* cited by examiner

METHOD AND APPARATUS FOR DETERMINING FACIAL POSE ANGLE, AND COMPUTER STORAGE MEDIUM

PRIORITY CLAIM

This application is a continuation-in-part application of PCT/CN2017/070607, entitled "METHOD AND DEVICE FOR DETERMINING ROTATION ANGLE OF HUMAN FACE, AND COMPUTER STORAGE MEDIUM" filed on Jan. 9, 2017, which claims priority to Chinese Patent Application No. 201610041938.7, filed with the State Intellectual Property Office of the People's Republic of China on Jan. 21, 2016, and entitled "METHOD AND DEVICE FOR DETERMINING ROTATION ANGLE OF HUMAN FACE, AND COMPUTER STORAGE MEDIUM", both of which are incorporated herein by reference in their entirety.

FIELD OF THE TECHNOLOGY

The present disclosure relates to the field of computer vision and facial recognition technologies, and in particular, to facial pose determination and related applications.

BACKGROUND OF THE DISCLOSURE

A facial recognition technology is to recognize a face image from an image shot by a video camera. When the video camera is shooting a face, the face performs a head motion such as head raising, head lowering, rotating to left or rotating to right. As a result, an angle exists between a face in an image shot by the video camera and a face of a frontal face image, the angle is a facial pose angle, and the facial recognition technology needs to determine the facial pose angle in the image, and can recognize a face image from the image according to the facial pose angle.

Currently, a facial pose angle is determined by using the following method: a face is made to perform head motions in different rotation directions in advance, face images in the different rotation directions are shot by using a video camera, texture features of a face image in each rotation direction is analyzed separately, and each rotation direction is made to correspond to the texture features of the face image in each rotation direction to form a correspondence. When a facial pose angle of a face image needs to be determined, texture features of the face image is analyzed, a correspondence is searched for texture features that are most similar to the texture features of the face images for which facial pose is being determined, a facial pose direction corresponding to the most similar texture features is obtained, and the facial pose angle of the face image is estimated according to the facial pose direction and the texture features.

The conventional method for determining a facial pose angle based on texture features, only a rough angle of facial pose can be determined, while a specific facial pose angle cannot be determined. Moreover, texture feature analysis is a complex process, and it is prone to incorrect facial pose angle because texture features were analyzed inaccurately.

There are many applications for facial pose angle determination, such as virtual reality and augmented reality applications, accessibility applications, image selection and recommendations, information presentation based on user's focus, etc. In these applications, the accuracy of facial pose angle determination and the speed of the determination are very important to the utility of the applications and the user experiences. In addition, in a lot of applications, the device that perform the determination are small, portable devices with limited processing power and battery life, thus, it is more important that the facial pose angle determination is fast, efficient, and less computation and memory intensity as those required by the conventional facial pose determination methods.

SUMMARY

To resolve a problem in the existing technology that a facial pose angle cannot be accurately determined, and that the computation itself is memory and computation intensive which is impractical for small portable devices, embodiments of the present technology provide a method and an apparatus for determining a facial pose angle that is fast and efficient, and does not require intensive modeling and deep learning which uses much more memory and computational power that a small portable device can typically provide.

In some embodiments, the facial pose angles that have been determined based on the method described herein are used to determine whether the user is paying attention to the display, and/or where on the display the user's attention is focused; and based on that information, the device determines whether to present information or alert, what information to present, and/or where to present the information or alert. In some embodiments, in accessibility applications, the user's ability to provide input using a finger or handheld device is limited, the device tracks the user's head pose and facial pose angle to determine whether to scroll the information, select an icon, or browse through a list of items on the display based on the current facial pose angle of the user. In some embodiments, in virtual reality and augmented reality applications, the facial pose angle is used to determine how the virtual world and the objects within it are oriented relative to the user's eyes. Currently, the head set or eye glasses that the user wears may include orientation sensors that detect the movement and orientation of the user's head. However, these sensors increase the manufacturing cost of these specialized equipment, and make them more bulky and heavy to wear. Thus it is more advantageous to have an external camera that captures the images of the user, and uses the image processing to determine the user's facial pose angles instead. This reduces the cost of the equipment, or completely eliminate the need for the specialized equipment in providing the augmented reality or virtual reality applications, where the images of the virtual world and objects within it are projected onto the user's retina or displayed on a regular display placed in front of the user's eyes.

In some embodiments, the technical solutions are as follows:

According to a first aspect, the embodiments of the present technology provide a method for determining a facial pose angle (e.g., including the yaw, pitch, and roll angles), including:

obtaining first location information of preset multiple facial feature points in a to-be-determined face image, a quantity of the multiple facial feature points being an odd number (e.g., 5, 7, etc.), the multiple facial feature points including multiple pairs of symmetrical facial feature points (e.g., a pair of points for inner corners of eyes and a pair of points for outer corners of the mouth) and one first facial feature point (e.g., a single point for the tip of the nose, or a single point for the center point between the eye brows, etc.), and the multiple facial feature points being not coplanar (e.g., the points at the inner corners of the eyes, the points at the outer corners of the mouth, and the point at the tip of the nose are on three different planes);

obtaining, according to first location information of facial feature points included in each pair of facial feature points of the multiple pairs of facial feature points, first location information of a symmetrical midpoint of each pair of facial feature points (e.g., the mid-point between the inner corners of the eyes, the mid-point between the outer corners of the mouth); and determining a facial pose angle of the to-be-determined face image according to (e.g., based on respective distances between) the first location information of the symmetrical midpoint of each pair of facial feature points (e.g., the mid-point between the inner corners of the eyes, the mid-point between the outer corners of the mouth) and first location information of the first facial feature point (e.g., the point at the tip of the nose).

According to a third aspect, the embodiments of the present technology further provide a computer storage medium, the computer storage medium storing a computer executable instruction, and the computer executable instruction being used to perform the method for determining a facial pose angle according to the embodiments of the present technology.

The technical solutions provided in the embodiments of the present technology bring about the following beneficial effects:

First, preset multiple pairs of symmetrical facial feature points and one first facial feature point are obtained; according to first location information of facial feature points included in each pair of facial feature points of the multiple pairs of facial feature points, first location information of a symmetrical midpoint of each pair of facial feature points is obtained; and a preset line segment ratio is calculated according to the first location information of the symmetrical midpoint of each pair of facial feature points and first location information of the first facial feature point, a correspondence between the preset line segment ratio and a facial pose angle is queried according to the line segment ratio, and the facial pose angle of the to-be-determined face image is determined, so as to resolve the problem that the facial pose angle cannot be determined. Because the correspondence between the preset line segment ratio and the facial pose angle is a relatively precise correspondence between a line segment ratio and an angle, the method for determining a facial pose angle provided in the embodiment of the present technology greatly improves precision of determining a facial pose angle.

BRIEF DESCRIPTION OF THE DRAWINGS

To describe the technical solutions of the embodiments of the present technology more clearly, the accompanying drawings for illustrating the embodiments will be introduced briefly in the following. Apparently, the drawings in the following description are only some embodiments of the present technology, and a person of ordinary skill in the art may obtain other drawings based on these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings. An "electronic device" mentioned in the text may include a smartphone, a tablet computer, an intelligent television, an e-book reader, an MP3 player (Moving Picture Experts Group Audio Layer III), an MP4 (Moving Picture Experts Group Audio Layer IV) player, a laptop portable computer, a desktop computer and the like.

Figure 1:
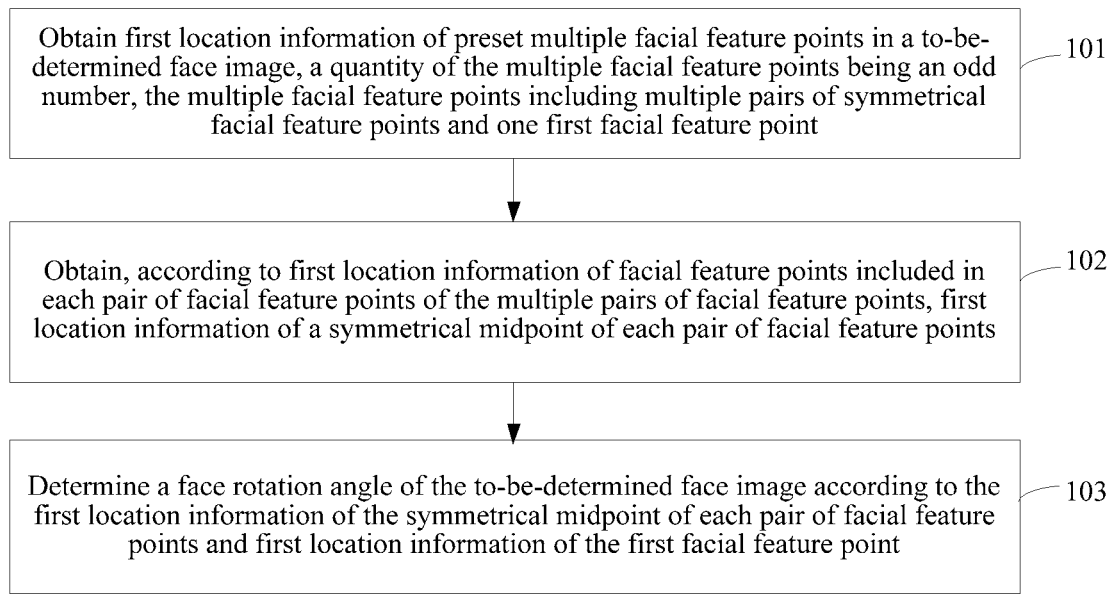
FIG. 1 is a flowchart of a method for determining a facial pose angle according to an embodiment of the present technology.

FIG. 1 is a flowchart of a method for determining a facial pose angle according to an embodiment of the present technology. Referring to FIG. 1, the method includes the following steps.

In step 101: Obtain first location information of preset multiple facial feature points in a to-be-determined face image, a quantity of the multiple facial feature points being an odd number (e.g., 5, 7, etc.), the multiple facial feature points including multiple pairs of symmetrical facial feature points (e.g., a pair of points for the inner corners of the eyes, and a pair of points for the outer corners of the mouth) and one first facial feature point (e.g., a single point for the tip of the nose), and the multiple facial feature points being not coplanar (e.g., the two pairs of points and the single point are on three different planes).

In step 102: Obtain, according to first location information of facial feature points included in each pair of facial feature points of the multiple pairs of facial feature points, first location information of a symmetrical midpoint of each pair of facial feature points (e.g., obtain the location of the mid-point of the inner corners of the eyes and the mid-point of the outer corners of the mouth).

In step 103: Determine a facial pose angle (e.g., a face rotation angle) of the to-be-determined face image according to the first location information of the symmetrical midpoint of each pair of facial feature points and first location information of the first facial feature point.

To sum up, according to the method for determining a facial pose angle provided in this embodiment, first, preset multiple pairs of symmetrical facial feature points and one first facial feature point are obtained; according to first location information of facial feature points included in each pair of facial feature points of the multiple pairs of facial feature points, first location information of a symmetrical midpoint of each pair of facial feature points is obtained; and a preset line segment ratio is calculated according to the first location information of the symmetrical midpoint of each pair of facial feature points and first location information of the first facial feature point, a correspondence between the preset line segment ratio and a facial pose angle is queried according to the line segment ratio, and the facial pose angle of the to-be-determined face image is determined. Because the correspondence between the preset line segment ratio and the facial pose angle is a relatively precise correspondence between a line segment ratio and an angle, the method for determining a facial pose angle provided in the embodiment of the present technology improves precision of determining a facial pose angle.

Figure 2A:
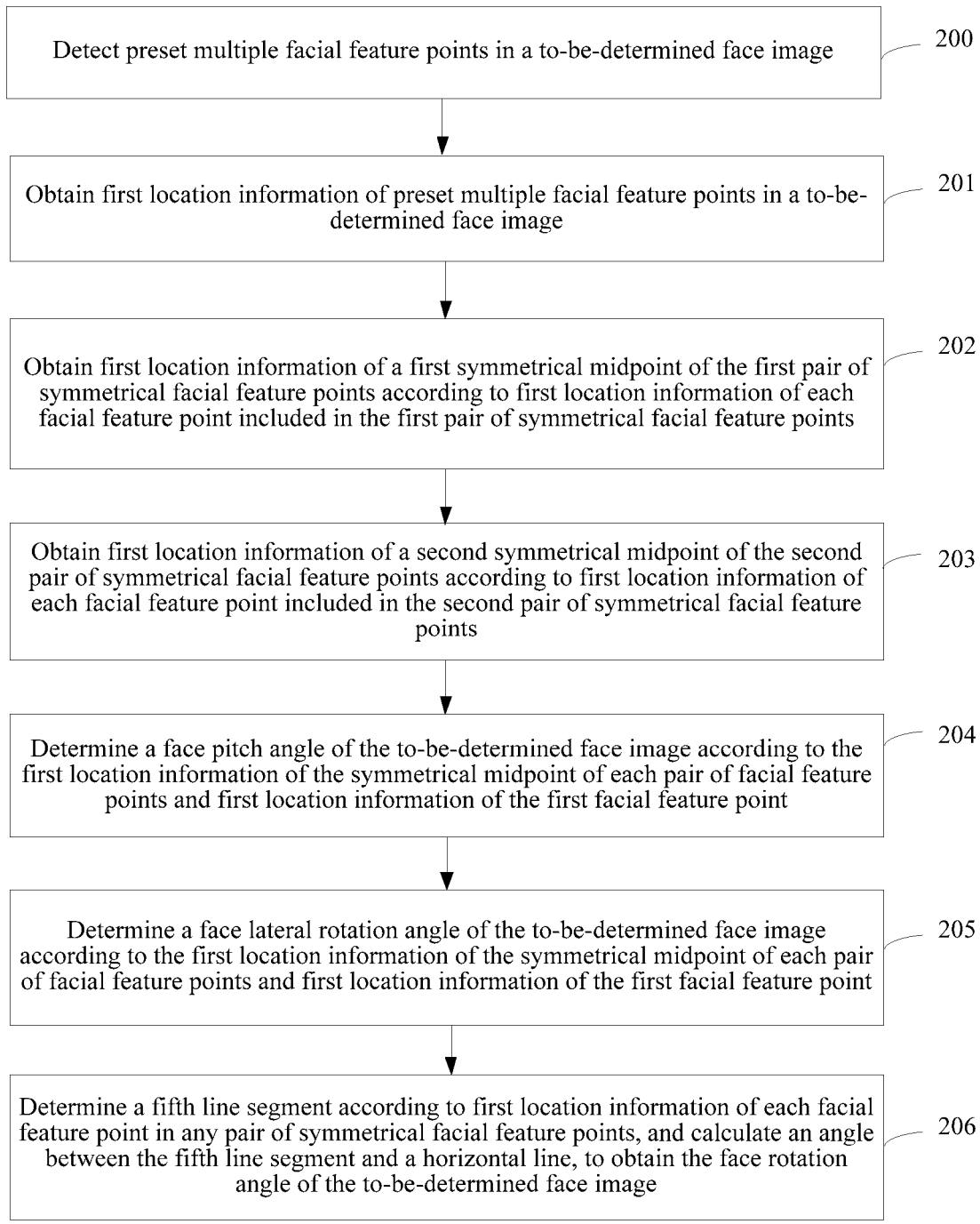
FIG. 2A is a flowchart of a method for determining a facial pose angle according to an embodiment of the present technology.

FIG. 2A is a flowchart of a method for determining a facial pose angle according to an embodiment of the present technology. In the method, preset multiple pairs of symmetrical facial feature points and one first facial feature point are obtained (e.g., inner corners of the eyes, outer corners of the mouth, and tip of the nose), and coordinate location information of the preset multiple pairs of symmetrical facial feature points and the first facial feature point in a to-be-determined face image is obtained; and a facial pose angle of the to-be-determined face image is determined according to the coordinate location information. Referring to FIG. 2A, the method includes the following steps.

In step 200: Detect preset multiple facial feature points in a to-be-determined face image.

The preset multiple facial feature points are selected from points that are easily recognized in a face, and a preset facial feature point is located on a contour of a facial organ, and may be a turning point of the contour of the facial organ. For example, a preset feature point may be an inner eye corner, an outer eye corner, a mouth corner, the tail of a brow, the head of a brow, or a nasal tip, both the inner eye corner and the outer eye corner are turning points of a contour of an eye, the mouth corner is a turning point of a contour of a mouth, the tail of the brow and the head of the brow are turning points of a contour of an eyebrow, and the nasal tip is a turning point of a contour of a nose. Some feature points of the preset multiple feature points have a left-right symmetry. For example, two inner eye corners, two outer eye corners, two tails of brows, two heads of the brows, and two mouth corners in a face all have a left-right symmetry. In some embodiments, in order to identify the symmetric feature points in the image, the image is preprocessed to obtain images of multiple regions at different resolution levels. For example, a low resolution version of the image is obtained, and feature extraction is performed on the low resolution version of the image to identify the general areas of the eyes, nose, and mouth. In the low resolution version of the image, the finer features such as the contour of the eyes, the eye brows, the contour of the nose, etc. are blurred, and only generalized regions are identified for each of the facial features. The processing of the low resolution version of the image provides a general guidance of the positions of the facial features, and the fine contours and features in the images are masked to reduce interference with the identification of the facial features when the image is not a full frontal image. After the regions of the facial features are identified, contour detection is performed for the eye regions, the nose region, the mouth region, separately using a high resolution version of the image, such that the contours of the eyes, brows, nose, and mouth are clearly delineated and identified.

A quantity of the preset multiple facial feature points is an odd number. For example, the quantity may be 5 or 7, the preset multiple facial feature points include multiple pairs of symmetrical facial feature points and one remaining first facial feature point, and the multiple facial feature points are not coplanar.

In an implementation, in this embodiment, the multiple facial feature points may include five facial feature points, and the five facial feature points include a first pair of symmetrical facial feature points, a second pair of symmetrical facial feature points, and one remaining first facial feature point. In this embodiment, the first pair of symmetrical facial feature points may be two inner eye corners, the second pair of symmetrical facial feature points may be two mouth corners, and the remaining first facial feature point is a nasal tip.

This step may be: first, a face in the to-be-determined face image is detected by using a face detection technology, and then the first pair of symmetrical facial feature points, that is, the two inner eye corners, the second pair of symmetrical facial feature points, that is, the two mouth corners, and the remaining first facial feature point, that is, the nasal tip are detected in the face by using a facial feature point detection technology.

Figure 2B:
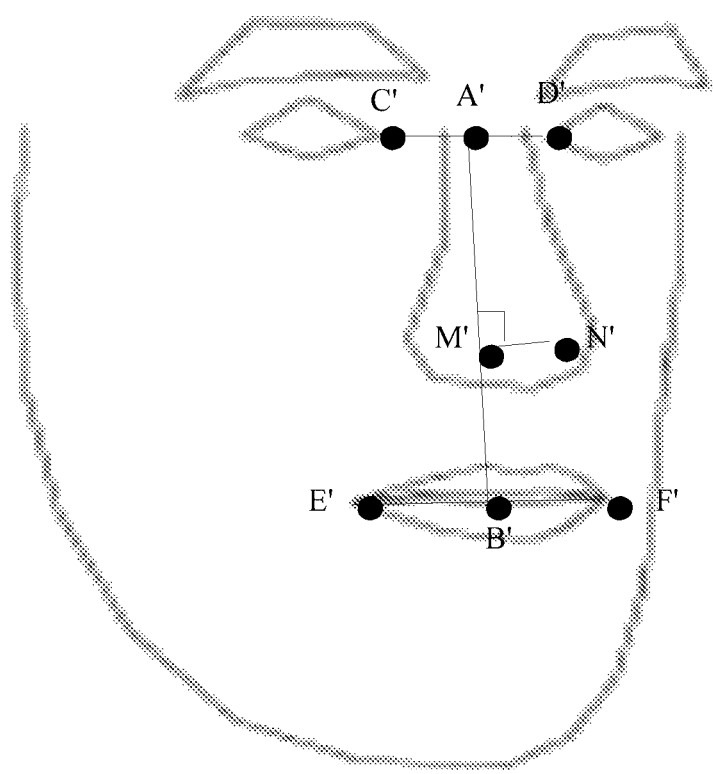
FIG. 2B is a schematic diagram of tagging some feature points in a to-be-determined face image according to an embodiment of the present technology.

Certainly, after the preset facial feature points are detected completely, the detected facial feature points may be tagged. Referring to FIG. 2B, FIG. 2B is a diagram of tagging feature points in a to-be-determined face image according to this embodiment (where the feature points in the figure not only include detected facial feature points, but also include a symmetrical midpoints formed by detected symmetrical facial feature points and another point, and are described in the following content). As shown in FIG. 2B, a detected preset first pair of symmetrical facial feature points, that is, two inner eye corners, are separately tagged as C' and D', a detected preset second pair of symmetrical facial feature points, that is, two mouth corners, are separately tagged as E' and F', and one detected preset remaining first facial feature point, that is, a nasal tip, is tagged as N'.

In step 201: Obtain first location information of preset multiple facial feature points in a to-be-determined face image.

The first location information is a coordinate location of the facial feature point in a two-dimensional rectangular coordinate system or three-dimensional rectangular coordinate system when the to-be-determined face image is placed in the rectangular coordinate system. The two-dimensional rectangular coordinate system is a method for denoting a plane by using two coordinate axes that are separately an x axis and a y axis, where the x axis and the y axis are two axial directions perpendicular to each other. Therefore, a coordinate form of the first location information of the facial feature point obtained by using the two-dimensional rectangular coordinate system is (x, y). The three-dimensional rectangular coordinate system is a method for denoting a space by using three coordinate axes that are separately an x axis, a y axis, and a z axis, where the x axis, the y axis, and the z axis are three axial directions perpendicular to each other. Therefore, a coordinate form of the first location information of the facial feature point obtained by using the three-dimensional rectangular coordinate system is (x, y, z).

After a facial feature point is detected, coordinates of the facial feature point are automatically obtained, where a coordinate form of the facial feature point is (x, y), and coordinates after positioning are output to a terminal. In this way, the terminal may directly obtain a coordinate location of the facial feature point after positioning. For example, coordinate locations obtained by the terminal of the preset first pair of symmetrical facial feature points (the two inner eye corners) are separately C' ($x_1$, $y_1$) and D' ($x_2$, $y_2$), coordinate locations obtained by the terminal of the second pair of symmetrical facial feature points (the two mouth corners) are separately E' ($x_3$, $y_3$) and F' ($x_4$, $y_4$), and a coordinate location obtained by the terminal of the remaining first facial feature point (the nasal tip) is N' ($x_5$, $y_5$). For example, it is assumed that the obtained coordinate locations of the five facial feature points are separately: C' (0, 0), D' (2, 2), E' (1, −2), F' (2, −1), and N' (1.5, 0). The original of the coordinate system is preset by the terminal based on various preset criteria that may be image dependent in some embodiments, and image independent in other embodiments.

In step 202: Obtain first location information of a first symmetrical midpoint of the first pair of symmetrical facial feature points according to first location information of each facial feature point included in the first pair of symmetrical facial feature points.

Still using the foregoing example as an example, the first pair of symmetrical facial feature points are two inner eye corners. Coordinates of the two inner eye corners are separately C' ($x_1$, $y_1$) and D' ($x_2$, $y_2$), and a first symmetrical midpoint of the first pair of symmetrical facial feature points is a midpoint of a line segment C'D' formed by points C' ($x_1$, $y_1$) and D' ($x_2$, $y_2$). As shown in FIG. 2B, the midpoint is tagged as A' ($x_6$, $y_6$), a coordinate location of A' ($x_6$, $y_6$) may be obtained by using a midpoint calculation formula. Specific calculation is shown in the following formulas (1) and (2):

$$x_6 = \frac{x_1 + x_2}{2} \quad (1)$$

$$y_6 = \frac{y_1 + y_2}{2} \quad (2)$$

For example, when coordinate locations of C' ($x_1$, $y_1$) and D' ($x_2$, $y_2$) are separately: C' (0, 0) and D' (2, 2), a coordinate location of a point A' ($x_6$, $y_6$) is calculated by using the following formulas (3) and (4):

$$x_6 = \frac{0 + 2}{2} = 1 \quad (3)$$

$$y_6 = \frac{0 + 2}{2} = 1 \quad (4)$$

Therefore, the first location information of the first symmetrical midpoint of the first pair of symmetrical facial feature points is A' (1, 1).

In step 203: Obtain first location information of a second symmetrical midpoint of the second pair of symmetrical facial feature points according to first location information of each facial feature point included in the second pair of symmetrical facial feature points.

For example, the second pair of symmetrical facial feature points are two mouth corners. Coordinates of the two mouth corners are separately E' ($x_3$, $y_3$) and F' ($x_4$, $y_4$), and a second symmetrical midpoint of the second pair of symmetrical facial feature points is a midpoint of a line segment E'F' formed by points E' ($x_3$, $y_3$) and F' ($x_4$, $y_4$). As shown in FIG. 2B, the midpoint is tagged as B', a coordinate location of B' ($x_7$, $y_7$) is obtained by using a midpoint calculation formula. Specific calculation is shown in the following formulas (5) and (6):

$$x_7 = \frac{x_3 + x_4}{2} \quad (5)$$

$$y_7 = \frac{y_3 + y_4}{2} \quad (6)$$

For example, when specific coordinates of the points E' ($x_3$, $y_3$) and F' ($x_4$, $y_4$) are E' (1, −2) and F' (2, −1), coordinates of the second symmetrical midpoint are calculated by using the following formulas (7) and (8):

$$x_7 = \frac{1 + 2}{2} = 1.5 \quad (7)$$

$$y_7 = \frac{-1 - 2}{2} = -1.5 \quad (8)$$

Therefore, the first location information of the second symmetrical midpoint of the second pair of symmetrical facial feature points is B' (1.5, −1.5).

In step 204: Determine a face pitch angle of the to-be-determined face image according to the first location information of the symmetrical midpoint of each pair of facial feature points and first location information of the first facial feature point.

The facial pose angle of the to-be-determined face image may be the face pitch angle or a face lateral rotation (yaw) angle. A method for determining a face pitch angle and a method for determining a face lateral rotation (yaw) angle are separately described below.

Figure 2C:
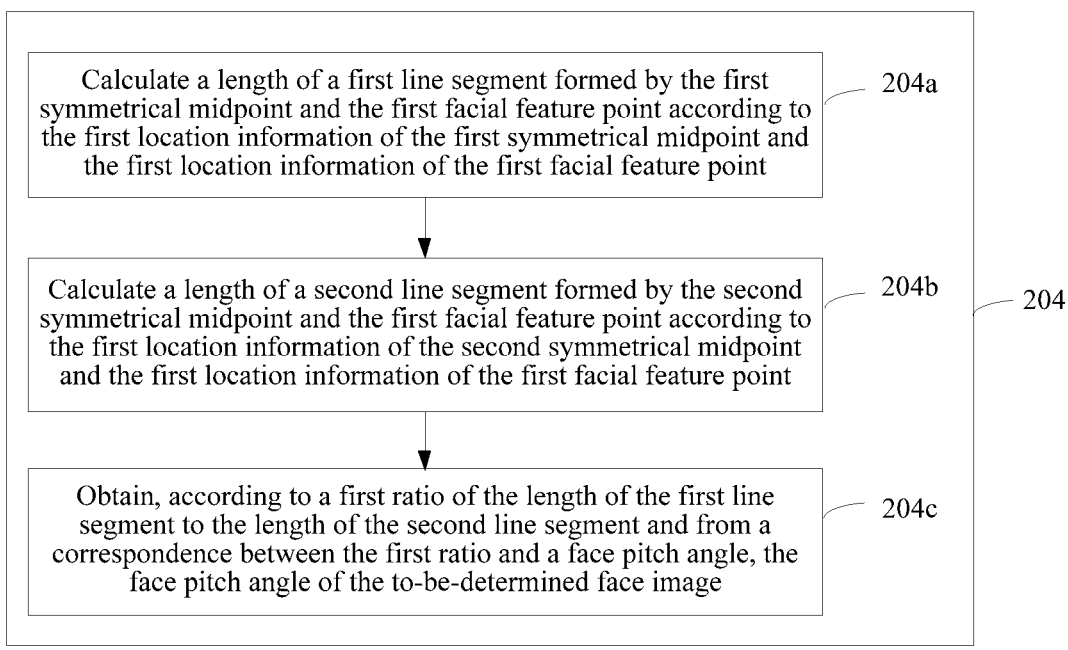
FIG. 2C is a flowchart of a method for determining a face pitch angle in a to-be-determined face image according to an embodiment of the present technology.

The face pitch angle of the to-be-determined face image is determined according to the first location information of the symmetrical midpoint of each pair of facial feature points and first location information of the first facial feature point. Referring to FIG. 2C, the method may include the following steps.

In step 204a: Calculate a length of a first line segment formed by the first symmetrical midpoint and the first facial feature point according to the first location information of the first symmetrical midpoint and the first location information of the first facial feature point.

It can be learned from step 202 that, the first symmetrical midpoint of the first pair of symmetrical facial feature points is A' ($x_6$, $y_6$), and the first location information of the first facial feature point is N' ($x_5$, $y_5$), and a length of a first line segment A'N' formed by the first symmetrical midpoint A' ($x_6$, $y_6$) and the first facial feature point N' ($x_5$, $y_5$) is calculated by using a formula for a distance between two points. Specific calculation is shown in the following formula (9):

$$A'N'=\sqrt{(x-x_6)^2+(y_5-y_6)^2} \qquad (9)$$

In step 204b: Calculate a length of a second line segment formed by the second symmetrical midpoint and the first facial feature point according to the first location information of the second symmetrical midpoint and the first location information of the first facial feature point.

It can be learned from step 203 that, the first symmetrical midpoint of the second pair of symmetrical facial feature points is B' ($x_7$, $y_7$), and the first location information of the first facial feature point is N' ($x_5$, $y_5$), and a length of a second line segment B'N' formed by the second symmetrical midpoint B' ($x_7$, $y_7$) and the first facial feature point N' ($x_5$, $y_5$) is calculated by using a formula for a distance between two points. Specific calculation is shown in the following formula (10):

$$B'N'=\sqrt{(x_7-x)^2+(y_5-y)^2} \qquad (10)$$

In step 204c: Obtain, according to a first ratio of the length of the first line segment to the length of the second line segment and from a correspondence between the first ratio and a face pitch angle, the face pitch angle of the to-be-determined face image.

The first ratio of the length A'N' of the first line segment to the length B'N' of the second line segment is calculated, a pre-established correspondence between the first ratio and the face pitch angle is queried according to the first ratio (for a process of establishing the correspondence, refer to the following steps 302a to 302e), and the face pitch angle corresponding to the calculated first ratio is queried from the correspondence, and the face pitch angle is determined as the face pitch angle of the to-be-determined face image.

It should be noted that if the first ratio calculated in this step is not found in all first ratios included in the pre-established correspondence table between the first ratio values and the face pitch angles, a first ratio closest to the first ratio calculated in this step is determined from all the first ratios in the correspondence table, and then a face pitch angle corresponding to the closest first ratio is used as the face pitch angle corresponding to the first ratio calculated in this step.

Additionally, the first ratio closest to the first ratio calculated in this step may be determined from all the first ratios in the correspondence by using the following method:

Subtraction is performed on each first ratio included in the pre-established correspondence table between the first ratio values and the face pitch angles and the first ratio calculated in this step, to obtain a first ratio difference, then an absolute value operation is performed on each first ratio difference, values obtained after the absolute value operation are compared, to obtain a minimum absolute value, then a first ratio corresponding to the minimum absolute value difference (a first ratio included in the correspondence between the first ratio and the face pitch angle) is obtained, and the first ratio is determined as the first ratio closest to the first ratio calculated in this step.

In step 205: Determine a face lateral rotation (yaw) angle of the to-be-determined face image according to the first location information of the symmetrical midpoint of each pair of facial feature points and first location information of the first facial feature point.

Figure 2D:
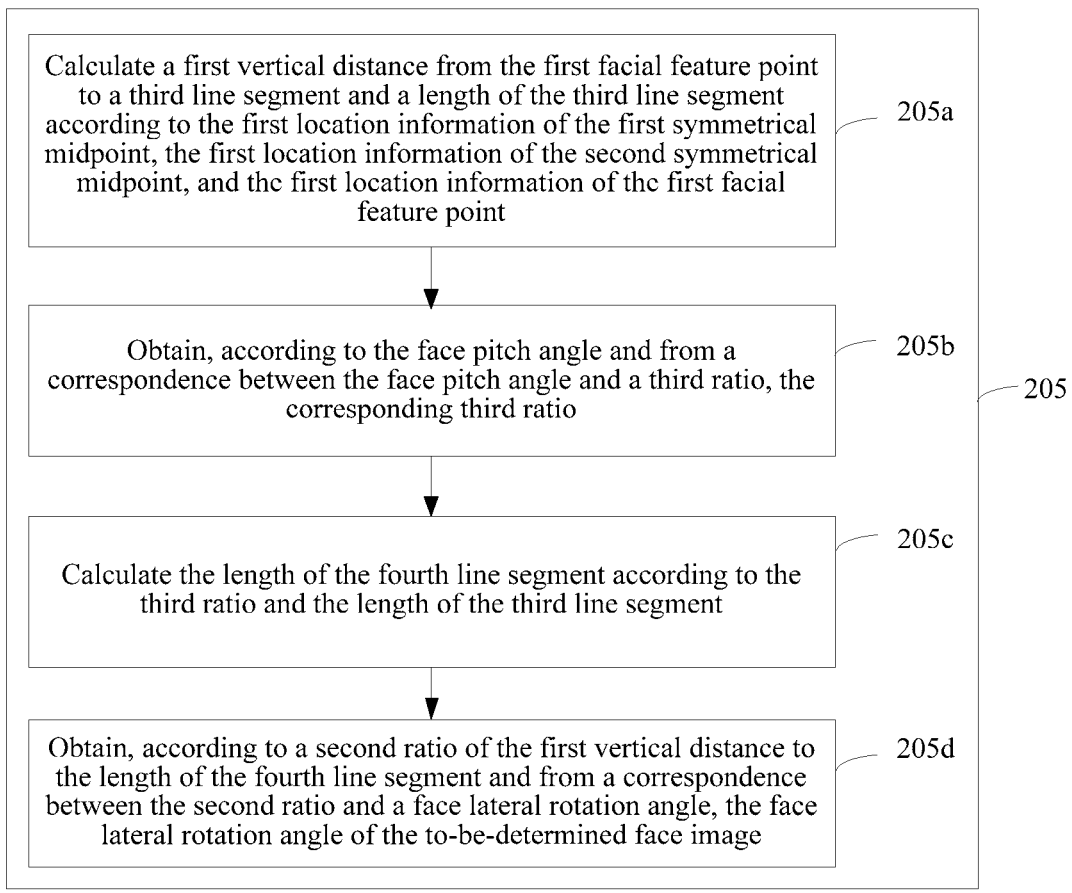
FIG. 2D is a flowchart of a method for determining a face lateral rotation (yaw) angle in a to-be-determined face image according to an embodiment of the present technology.

The face lateral rotation angle of the to-be-determined face image is determined according to the first location information of the symmetrical midpoint of each pair of facial feature points, the first location information of the first facial feature point, and the face pitch angle that is determined by using the foregoing process. Referring to FIG. 2D, the method may include the following steps.

In step 205a: Calculate a first vertical distance from the first facial feature point (e.g., the point at the tip of the nose) to a third line segment (e.g., the segment A'B') and a length of the third line segment (e.g., the segment A'B') according to the first location information of the first symmetrical midpoint (e.g., the mid-point between the inner corners of the eyes), the first location information of the second symmetrical midpoint (e.g., the mid-point between the outer corners of the mouth), and the first location information of the first facial feature point (e.g., the tip of the nose).

It can be learned from step 202 that, the first location information of the first symmetrical midpoint is A' ($x_6$, $y_6$). It can be learned from step 203 that, the first location information of the second symmetrical midpoint is B' ($x_7$, $y_7$). It can be learned from step 201 that, the first location information of the first facial feature point is N' ($x_5$, $y_5$). The third line segment is a line segment A'B' formed by the first symmetrical midpoint A' ($x_6$, $y_6$) and the second symmetrical midpoint B' ($x_7$, $y_7$), and the first vertical distance from the first facial feature point to the third line segment is calculated by using the following method: first, a straight line passing through the point A' and the point B' is tagged as a straight line c, a general straight-line equation of the straight line c is calculated according to the first location information of the point A' and the point B', and then a first vertical distance from the first facial feature point N' to the straight line c is calculated according to the first location information of the first facial feature point N'. Details are as follows:

First, an equation of a two-point-form straight line passing through the point A' ($x_6$, $y_6$) and the point B' ($x_7$, $y_7$) is obtained according to a two-point-form straight line formula, and the equation of a two-point-form straight line is shown in the following formula (11):

$$\frac{x-x_6}{x_7-x_6} = \frac{y+y_6}{y_7-y_6} \qquad (11)$$

The foregoing equation is equivalently transformed, and transformed into a general straight-line equation, and the general straight-line equation is shown in the following formula (12):

$$(y_7-y_6)x-(x_7-x_6)y+x_7 \times y_6 - x_6 \times y_7 = 0 \qquad (12)$$

Certainly, the straight line c passing through the point A' ($x_6$, $y_6$) and the point B' ($x_7$, $y_7$) may be further calculated by using another method, and details are not described herein.

Then, a distance d from the first facial feature point N' ($x_5$, $y_5$) to the straight line c is calculated according to a point-to-line distance formula, and specific calculation is shown in the following formula (13):

$$d = \frac{|(y_7-y_6)x_5 - (x_7-x_6)y_5 + x_7 \times y_6 - x_6 \times y_7|}{\sqrt{(y_7-y_6)^2 + (x_7-x_6)^2}} \qquad (13)$$

Because the straight line c is a straight line passing through the point A' ($x_6$, $y_6$) and the point B' ($x_7$, $y_7$), the distance d from the first facial feature point N' ($x_5$, $y_5$) to the straight line c is a second vertical distance from the first facial feature point N' ($x_5$, $y_5$) to the third line segment A'B'. Therefore, the first vertical distance is the distance d.

The length of the third line segment is obtained by using a formula for a distance between two points, and specific calculation is shown in the following formula (14):

$$A'B' = \sqrt{(x_7-x_6)^2+(y_7-y_6)^2} \quad (14)$$

In step 205b: Obtain, according to the face pitch angle and from a correspondence between the face pitch angle and a third ratio, the corresponding third ratio.

A pre-established correspondence between a third ratio and a face pitch angle is queried according to the face pitch angle determined in step 204 (for a process of establishing the correspondence, refer to subsequent steps 303a to 303f), a third ratio corresponding to a face pitch angle is queried from the correspondence table, the face pitch angle is the face pitch angle determined in step 204, and the third ratio is tagged as e.

It should be noted that if the face pitch angle determined in step 204 is not found in all face pitch angles included in the pre-established correspondence table between values of a third ratio and values of a face pitch angle, a face pitch angle closest to the face pitch angle calculated in step 204 is determined from all the face pitch angles, and then a third ratio corresponding to the closest face pitch angle is used as the third ratio corresponding to the face pitch angle.

Additionally, the face pitch angle closest to the face pitch angle calculated in step 204 may be determined from all the face pitch angles by using the following method.

Subtraction is performed on each face pitch angle included in the pre-established correspondence between the third ratio and the face pitch angle and the face pitch angle determined in step 204, to obtain a face pitch angle difference, then an absolute value operation is performed on each face pitch angle difference, values obtained after the absolute value operation are compared, to obtain a minimum absolute value, then a face pitch angle corresponding to the minimum absolute value (a face pitch angle included in the correspondence between the third ratio and the face pitch angle) is obtained, and the face pitch angle is determined as the face pitch angle closest to the face pitch angle calculated in step 204.

It can be learned from step 303d, step 303e, and step 303f that, the third ratio is a ratio of the following two values: a first value that is a line segment formed by the symmetrical midpoint (e.g., A') of the first pair of facial feature points (e.g., C' and D') and the symmetrical midpoint (e.g., B') of the second pair of facial feature points (e.g., E' and F') in the to-be-determined face image, that is, the third line segment A'B', and a second value that is a fourth line segment AB formed by a third symmetrical midpoint A of the first pair of facial feature points in a frontal face image and a fourth symmetrical midpoint B of the second pair of facial feature points in the frontal face image (not shown). Therefore, a value of e is a ratio of the third line segment to the fourth line segment, and therefore the value of e is calculated by using the following formula (15):

$$e = \frac{A'B'}{AB} \quad (15)$$

In step 205c: Calculate the length of the fourth line segment according to the third ratio and the length of the third line segment.

It can be learned from step 205b that, the third ratio is the ratio of the third line segment to the fourth line segment. Therefore, the length of the fourth line segment is a ratio of the third line segment to the third ratio. Therefore, the value of the fourth line segment may be calculated by using the following formula (16):

$$AB = \frac{A'B'}{e} \quad (16)$$

In step 205d: Obtain, according to a second ratio of the first vertical distance to the length of the fourth line segment and from a correspondence table between the values of the second ratio and values of the face lateral rotation angles, the face lateral rotation angle of the to-be-determined face image.

This step may be: The second ratio of the first vertical distance d to the length the fourth line segment AB is calculated, a pre-established correspondence table between the second ratio and the face lateral rotation angle is queried according to the second ratio (for a process of establishing the correspondence table, refer to subsequent steps 304a to 304b), and a face lateral rotation angle corresponding to a second ratio same as the calculated second ratio is queried from the correspondence table, and the face lateral rotation angle is determined as the face lateral rotation angle of the to-be-determined face image.

It should be noted that if the second ratio calculated in this step is not found in all second ratios included in the pre-established correspondence table between the second ratio and the face lateral rotation angle, a second ratio closest to the second ratio calculated in this step is determined from all the second ratios in the correspondence, and then a face lateral rotation angle corresponding to the closest second ratio is used as the face lateral rotation angle corresponding to the second ratio calculated in this step.

Additionally, the second ratio closest to the second ratio calculated in this step may be determined from all the second ratios in the correspondence by using the following method:

Subtraction is performed on each second ratio included in the pre-established correspondence between the second ratio and the face lateral rotation angle and the second ratio calculated in this step, to obtain a second ratio difference, then an absolute value operation is performed on each second ratio difference, values obtained after the absolute value operation are compared, to obtain a minimum absolute value, then a second ratio corresponding to the minimum absolute value (a second ratio included in the correspondence between the second ratio and the face lateral rotation angle) is obtained, and the second ratio is determined as the second ratio closest to the second ratio calculated in this step.

In step 206: Determine a fifth line segment according to first location information of each facial feature point in any pair of symmetrical facial feature points, and calculate an angle between the fifth line segment and a horizontal line, to obtain the facial pose angle of the to-be-determined face image.

The fifth line segment is a line segment formed by two facial feature points in any pair of symmetrical facial feature points in the preset facial feature points. Therefore, two points forming the fifth line segment in this embodiment may be the first pair of symmetrical facial feature points, that is, the two inner eye corners, or a second pair of symmetrical facial feature points, that is, the two mouth corners.

The facial pose angle is an angle obtained by rotating the face horizontally when a frontal direction of the face is always forward.

For example, the any pair of symmetrical facial feature points are two inner eye corners C' $(x_1, y_1)$ and D' $(x_2, y_2)$, and the fifth line segment is a line segment C'D' determined according to points C' $(x_1, y_1)$ and D' $(x_2, y_2)$. Certainly, the fifth line segment may be two mouth corners E' $(x_3, y_3)$ and F' $(x_4, y_4)$, and the fifth line segment is a line segment E'F' determined according to points E' $(x_3, y_3)$ and F' $(x_4, y_4)$.

For example, if the fifth line segment is C'D', a specific process of calculating an angle (denoted by using $\angle\alpha$) between the fifth line segment and the horizontal line is as follows:

First, a cosine value of $\angle\alpha$ is calculated. Referring to FIG. 2D, a specific method for calculating the cosine value of $\angle\alpha$ is shown in the following formula (17):

$$\cos\angle\alpha = \frac{|x_2 - x_1|}{\sqrt{(x_1 - x_2)^2 + (y_1 - y_2)^2}} \quad (17)$$

Therefore, the value of $\angle\alpha$ may be obtained by taking inverse cosine of the foregoing cosine value of $\angle\alpha$, and a specific calculation method is shown in the following formula (18):

$$\angle\alpha = \arccos\frac{|x_2 - x_1|}{\sqrt{(x_1 - x_2)^2 + (y_1 - y_2)^2}} \quad (18)$$

$\angle\alpha$ is the facial pose angle of the to-be-determined face image.

For example, when coordinate locations of C' $(x_1, y_1)$ and D' $(x_2, y_2)$ are separately: C' (0, 0) and D' (2, 2), a process of calculating $\angle\alpha$ is shown in the following formula (19):

$$\angle\alpha = \arccos\frac{|2 - 0|}{\sqrt{(0 - 2)^2 + (0 - 2)^2}} = \arccos\frac{\sqrt{2}}{2} = \frac{\pi}{2} \quad (19)$$

Therefore, $\angle\alpha$ is 45°.

It should be noted that when the facial pose angle of the to-be-determined face image is determined, the facial pose angle may be determined only according to the first location information of each facial feature point in any pair of symmetrical facial feature points. Therefore, in an actual operation, if only a facial pose angle of a face image needs to be determined, step 206 may be directly performed after step 201 is performed completely.

To sum up, according to the method for determining a facial pose angle provided in this embodiment of the present technology, first, preset multiple pairs of symmetrical facial feature points and one first facial feature point are obtained; according to first location information of facial feature points included in each pair of facial feature points of the multiple pairs of facial feature points, first location information of a symmetrical midpoint of each pair of facial feature points is obtained; and a preset line segment ratio is calculated according to the first location information of the symmetrical midpoint of each pair of facial feature points and first location information of the first facial feature point, a correspondence between the preset line segment ratio and a facial pose angle is queried according to the line segment ratio, and the facial pose angle of the to-be-determined face image is determined, so as to resolve the problem that the facial pose angle cannot be determined. Because the correspondence between the preset line segment ratio and the facial pose angle is a relatively precise correspondence between a line segment ratio and an angle (as for a reason why the correspondence is a relatively precise correspondence is discussed in the following content), the method for determining a facial pose angle provided in the embodiment of the present technology improves precision of determining a facial pose angle.

When either of a face pitch angle and a face lateral rotation angle of the to-be-determined face image is determined, a correspondence between a line segment ratio and a preset facial pose angle needs to be queried. The correspondence is already established before a rotation angle of the to-be-determined face image is determined, so that the correspondence may be directly queried when the rotation angle of the to-be-determined face image is determined. A line segment is a line segment formed by connecting midpoints of two facial feature points of preset multiple facial feature points, a vertical line segment formed by a vertical distance from a facial feature point to another straight line, or the like.

Figure 3A:
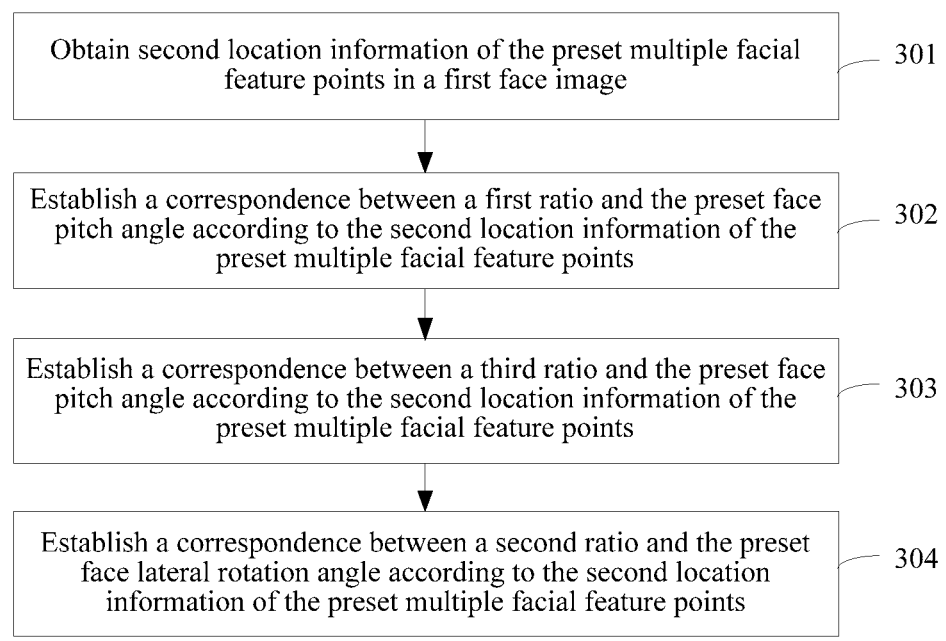
FIG. 3A is a flowchart of a method for determining a correspondence between a line segment ratio and a preset facial pose angle according to an embodiment of the present technology.

In this embodiment, three correspondences between line segment ratios and preset facial pose angles are established. A first correspondence is a correspondence between a first ratio and a preset face pitch angle, a second correspondence is a correspondence between a third ratio and a preset face pitch angle, and a third correspondence is a correspondence between a second ratio and a preset face lateral rotation angle. Referring to FIG. 3A, an establishment process is as follows:

In step 301: Obtain second location information of the preset multiple facial feature points in a first face image.

The meaning of the preset multiple facial feature points is the same as that of the foregoing preset multiple facial feature points, and details are not described herein.

The first face image is a face image that is shot after a face rotates by a preset facial pose angle. The preset facial pose angle includes a preset face pitch angle and a preset face lateral rotation angle, the preset face pitch angle and the preset face lateral rotation angle may be a series of preset discrete rotation angles, and a difference between each two neighboring rotation angles of this series of discrete rotation angles is the same. The difference is relatively small, and may be set to 1°, 2°, or another relatively small value, so as to ensure that a comprehensive correspondence between a line segment ratio and the preset facial pose angle is established in the following process, so that when the correspondence is queried, an accurate line segment ratio and an accurate facial pose angle may be obtained.

The second location information is obtained by placing the face in a three-dimensional rectangular coordinate system (three coordinate axes are used and are separately an x axis, a y axis, and a z axis, and the x axis, the y axis, and the z axis are three axial directions perpendicular to each other, and are a method for denoting a space). The three-dimensional rectangular coordinate system may be any three-dimensional rectangular coordinate system. Therefore, a coordinate form of the second location information of the facial feature point obtained by using the three-dimensional rectangular coordinate system is (x, y, z).

Therefore, the foregoing preset facial pose angle may be described in the following manner: a face pitch angle is a facial pose angle obtained when a frontal face rotates along the y axis, but does not rotate on the x axis or the z axis; and a face lateral rotation angle is a facial pose angle obtained when the frontal face rotates along the z axis, but does not rotate on the x axis or the y axis.

In an implementation, the preset facial pose angle may be obtained by using the following method: an initial facial pose angle is set to 0°, that is, the front of the face is forward and has not any rotation angle, and a difference between two neighboring rotation angles is preset; therefore, a first preset facial pose angle is the difference between the two neighboring rotation angles, a second preset rotation angle is the first preset facial pose angle plus the difference between the two neighboring rotation angles, and a third preset rotation angle is the second preset facial pose angle plus the difference between the two neighboring rotation angles; and all preset facial pose angles are obtained sequentially according to this method, and a quantity of the preset facial pose angles is a ratio of 360 to the preset difference between the two neighboring rotation angles.

Using a preset face pitch angle as an example, first, a face is set to a frontal face, and a difference between two neighboring face pitch angles is preset to 1°; therefore, a first preset facial pose angle is a difference 1° between the two neighboring rotation angles, a second preset rotation angle is the first preset facial pose angle plus the difference between the two neighboring rotation angles, that is, 1°+1°=2°, and a third preset rotation angle is the second preset facial pose angle plus the difference between the two neighboring rotation angles, that is, 2°+1°=3°; preset face pitch angles are obtained sequentially according to this method, and a quantity of the preset facial pose angles is a ratio of 360° to the preset difference 1° between the two neighboring rotation angles, that is, 360.

In an implementation, the second location information of the preset multiple facial feature points in the first face image may be obtained by using the following method: first, a face is placed as a frontal face, and the frontal face is rotated according to a preset angle difference between each two neighboring facial pose angles; after the frontal face is rotated by the preset angle difference each time, a face image is shot, and coordinate locations of preset multiple facial feature points of the shot face image are obtained, and are tagged as second location information. For example, if a difference between each two neighboring facial pose angles is 1°, the frontal face is first rotated by 1°, the face is shot in this case, to obtain a face image, and coordinate locations of preset multiple facial feature points of the face image are obtained; and then the face continues to be rotated by 1°, the face is shot again to obtain a face image, and coordinate locations of preset multiple facial feature points in the face image in this case are obtained; the foregoing steps are repeated, until the face is rotated by all preset angles and a coordinate locations of the facial feature points at each preset angle are obtained.

Figure 3B:
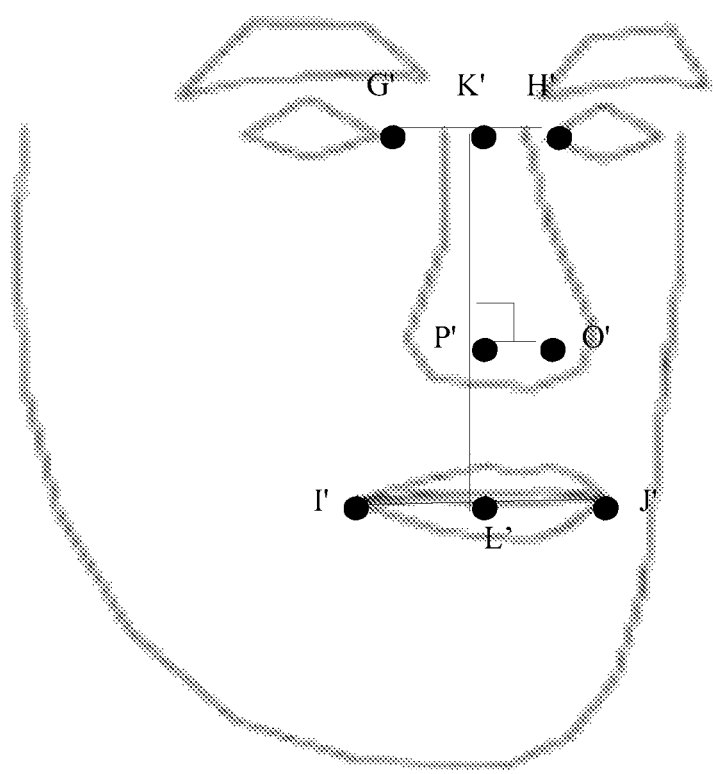
FIG. 3B is a schematic diagram of tagging some feature points in a first face image according to an embodiment of the present technology.

Referring to FIG. 3B, FIG. 3B includes multiple facial feature points in a first face image shown in this embodiment. As shown in FIG. 3B, two inner eye corners in a preset first pair of symmetrical facial feature points are separately tagged as G' and H', two mouth corners of a second pair of symmetrical facial feature points are separately tagged as I' and J', and one remaining first facial feature point is a nasal tip and tagged as O'. Coordinates of second locations of the preset multiple facial feature points in the first face image are separately: G' ($x_9$, $y_9$, $z_9$), H' ($x_{10}$, $y_{10}$, $z_{10}$), I' ($x_{11}$, $y_{11}$, $z_{11}$), J' ($x_{12}$, $y_{12}$, $z_{12}$), and O' ($x_{13}$, $y_{13}$, $z_{13}$).

In step 302: Establish a correspondence between a first ratio and the preset face pitch angle according to the second location information of the preset multiple facial feature points.

Figure 3C:
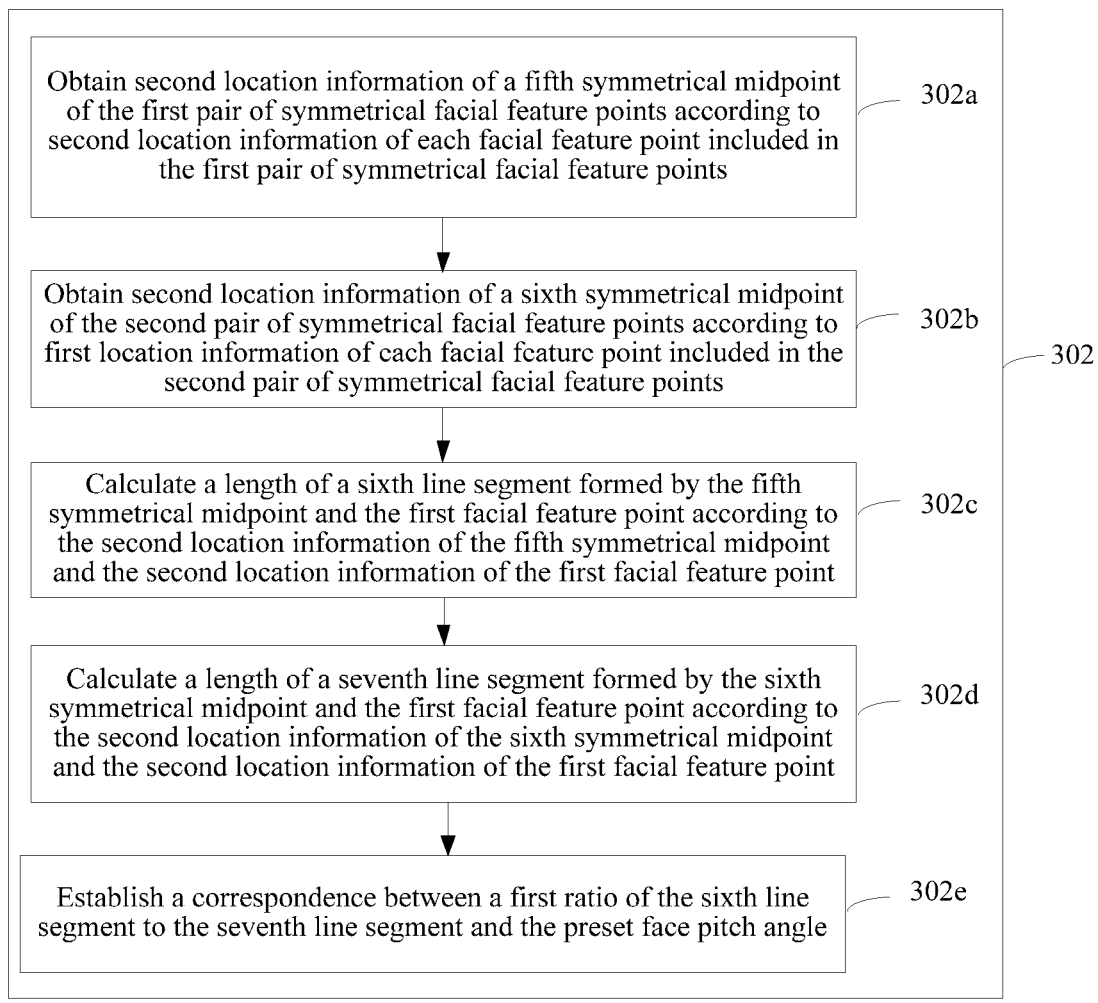
FIG. 3C is a method flowchart of a process of establishing a correspondence between a first ratio and a preset face pitch angle according to an embodiment of the present technology.

The first correspondence is the correspondence between values of the first ratio and corresponding values of the preset face pitch angle. Referring to FIG. 3C, FIG. 3C is a method flowchart of a process of establishing a correspondence between a first ratio and a preset face pitch angle, and the method includes the following steps.

In step 302a: Obtain second location information of a fifth symmetrical midpoint of the first pair of symmetrical facial feature points according to second location information of each facial feature point included in the first pair of symmetrical facial feature points.

Still using the foregoing example as an example, the first pair of symmetrical facial feature points are two inner eye corners G' ($x_9$, $y_9$, $z_9$) and H' ($x_{10}$, $y_{10}$, $z_{10}$). Still referring to FIG. 3B, a fifth symmetrical midpoint of the first pair of symmetrical facial feature points is a midpoint of a line segment G'H' formed by the point G' ($x_9$, $y_9$, $z_9$) and the point H' ($x_{10}$, $y_{10}$, $z_{10}$), the midpoint of the line segment G'H' is tagged as K', a coordinate location of K' ($x_{14}$, $y_{14}$, $z_{14}$) is obtained by using a midpoint calculation formula, and a specific calculation process is shown in the following formulas (20), (21) and (22):

$$x_{14} = \frac{x_9 + x_{10}}{2} \tag{20}$$

$$y_{14} = \frac{y_9 + y_{10}}{2} \tag{21}$$

$$z_{14} = \frac{z_9 + z_{10}}{2} \tag{22}$$

In step 302b: Obtain second location information of a sixth symmetrical midpoint of the second pair of symmetrical facial feature points according to first location information of each facial feature point included in the second pair of symmetrical facial feature points.

Still using the foregoing example as an example, the second pair of symmetrical facial feature points are two mouth corners I' ($x_{11}$, $y_{11}$, $z_{11}$) and J' ($x_{12}$, $y_{12}$, $z_{12}$). Still referring to FIG. 3B, a sixth symmetrical midpoint of the second pair of symmetrical facial feature points is a midpoint of a line segment formed by points I' ($x_{11}$, $y_{11}$, $z_{11}$) and J' ($x_{12}$, $y_{12}$, $z_{12}$), the midpoint is tagged as L', a coordinate location of L' ($x_{15}$, $y_{15}$, $z_{15}$) is obtained by using a midpoint calculation formula, and a specific calculation process is shown in the following formulas (23), (24) and (25):

$$x_{15} = \frac{x_{11} + x_{12}}{2} \tag{23}$$

$$y_{15} = \frac{y_{11} + y_{12}}{2} \tag{24}$$

$$z_{15} = \frac{z_{11} + z_{12}}{2} \tag{25}$$

In step 302c: Calculate a length of a sixth line segment formed by the fifth symmetrical midpoint and the first facial feature point according to the second location information of the fifth symmetrical midpoint and the second location information of the first facial feature point.

Still using the foregoing example as an example, the second location information of the fifth symmetrical midpoint is K' ($x_{14}$, $y_{14}$, $z_{14}$), the first facial feature point is a nasal tip O' ($x_{13}$, $y_{13}$, $z_{13}$), the sixth line segment formed by the fifth symmetrical midpoint and the first facial feature point is a length of a line segment K'O' formed by K' ($x_{14}$, $y_{14}$, $z_{14}$) and the point O' ($x_{13}$, $y_{13}$, $z_{13}$), the length of the sixth line segment is calculated by using a formula for a distance between two points, and specific calculation is shown in the following formula (26):

$$K'O' = \sqrt{(x_{14}-x_{13})^2 + (y_{14}-y_{13})^2 + (z_{14}-z_{13})^2} \tag{26}$$

In step 302d: Calculate a length of a seventh line segment formed by the sixth symmetrical midpoint and the first facial feature point according to the second location information of the sixth symmetrical midpoint and the second location information of the first facial feature point.

Still using the foregoing example as an example, the second location information of the sixth symmetrical midpoint is L' ($x_{15}$, $y_{15}$, $z_{15}$), the first facial feature point is a nasal tip O' ($x_{13}$, $y_{13}$, $z_{13}$), the seventh line segment formed by the sixth symmetrical midpoint and the first facial feature point is a length of a line segment L'O' formed by L' ($x_{15}$, $y_{15}$, $z_{15}$) and the point O' ($x_{13}$, $y_{13}$, $z_{13}$), the length of the seventh line segment is calculated by using a formula for a distance between two points, and specific calculation is shown in the following formula (27):

$$L'O' = \sqrt{(x_{15}-x_{13})^2 + (y_{15}-y_{13})^2 + (z_{15}-z_{13})^2} \tag{27}$$

In step 302e: Establish a correspondence between a first ratio of the sixth line segment to the seventh line segment and the preset face pitch angle.

Still using the foregoing example as an example, the sixth line segment is K'O', and the seventh line segment is L'O', and therefore the first ratio is a ratio of K'O' to L'O'. A correspondence between the first ratio and the preset face pitch angle is obtained by using the following method: a face is rotated; when a facial pose angle is a preset first face pitch angle, the face is stopped from being rotating; in a case of the first face pitch angle, a ratio of K'O' to L'O' is calculated, to obtain a first ratio, and a correspondence between the first ratio and the preset first face pitch angle is stored; and the face continues to be rotated; when the facial pose angle is a preset second face pitch angle, in a case of the second face pitch angle, a ratio of K'O' to L'O' is calculated, to obtain a second first ratio, and a correspondence between the second first ratio and the preset second face pitch angle is stored; and the foregoing steps are repeated, until correspondences between all first ratios and preset face pitch angles are stored completely.

In step 303: Establish a correspondence between a third ratio and the preset face pitch angle according to the second location information of the preset multiple facial feature points.

Figure 3D:
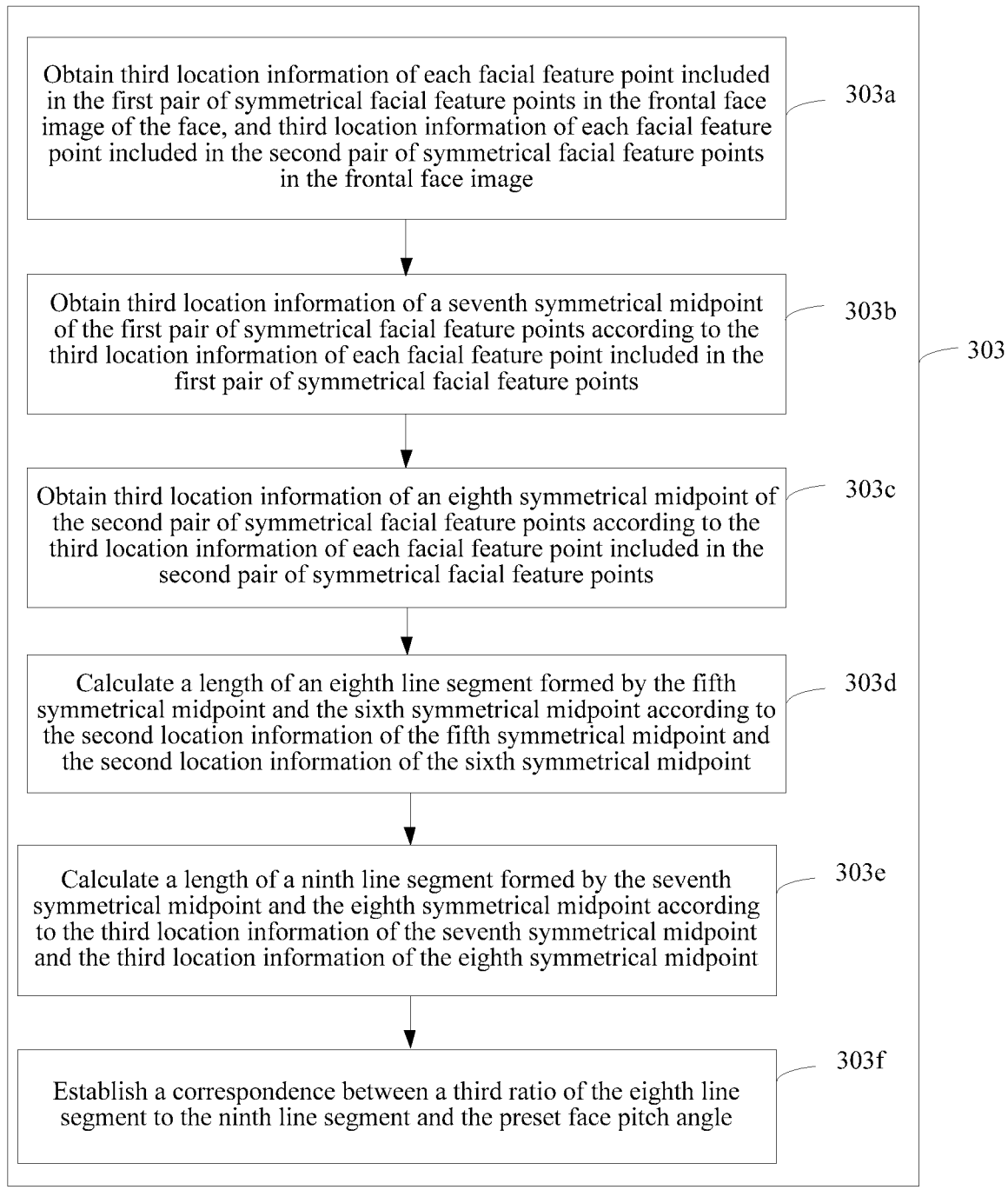
FIG. 3D is a method flowchart of a process of establishing a correspondence between a third ratio and a preset face pitch angle according to an embodiment of the present technology.

The second correspondence is the correspondence between the third ratio and the preset face pitch angle. Referring to FIG. 3D, FIG. 3D is a method flowchart of a process of establishing a correspondence between a third ratio and a preset face pitch angle, and the method includes the following steps.

In step 303a: Obtain third location information of each facial feature point included in the first pair of symmetrical facial feature points in the frontal face image of the face, and third location information of each facial feature point included in the second pair of symmetrical facial feature points in the frontal face image.

Figure 3E:
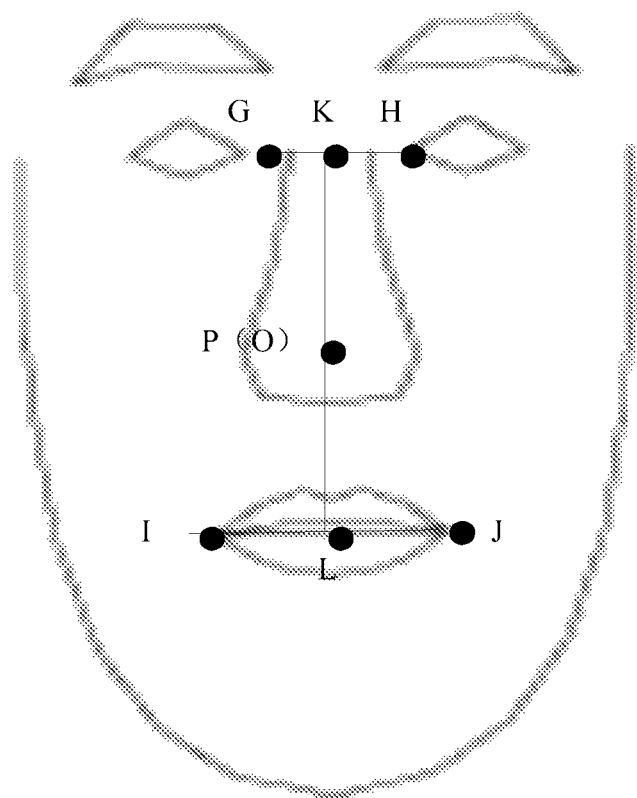
FIG. 3E is a schematic diagram of some feature points in a frontal face image when a first face image is the frontal face image according to an embodiment of the present technology.

Refer to FIG. 3E, FIG. 3E includes multiple facial feature points in a frontal face image when a first face image shown this embodiment is the frontal face image. As shown in FIG. 3E, the first pair of symmetrical facial feature points are two inner eye corners and are separately tagged as G and H, and third location information of G and third location information of H in the frontal face image of the face are respectively G ($x_{16}$, $y_{16}$, $z_{16}$) and H ($x_{17}$, $y_{17}$, $z_{17}$). The second pair of symmetrical facial feature points are two mouth corners and are separately tagged as I and J, and third location information of I and third location information of J in the frontal face image are respectively I ($x_{20}$, $y_{20}$, $z_{20}$) and J ($x_{21}$, $y_{21}$, $z_{21}$).

In step 303b: Obtain third location information of a seventh symmetrical midpoint of the first pair of symmetrical facial feature points according to the third location information of each facial feature point included in the first pair of symmetrical facial feature points.

Still using the foregoing example as an example, still referring to FIG. 3E, the first pair of symmetrical facial feature points are two inner eye corners G ($x_{16}$, $y_{16}$, $z_{16}$) and H ($x_{17}$, $y_{17}$, $z_{17}$), a seventh symmetrical midpoint of the first pair of symmetrical facial feature points is a midpoint of a line segment formed by the points G ($x_{16}$, $y_{16}$, $z_{16}$) and H ($x_{17}$, $y_{17}$, $z_{17}$), the midpoint is tagged as K, a coordinate location of K ($x_{18}$, $y_{18}$, $z_{18}$) is obtained by using a midpoint calculation formula, and specific calculation is shown in the following formulas (28), (29) and (30):

$$x_{18} = \frac{x_{16} + x_{17}}{2} \tag{28}$$

$$y_{18} = \frac{y_{16} + y_{17}}{2} \tag{29}$$

$$z_{18} = \frac{z_{16} + z_{17}}{2} \tag{30}$$

In step 303c: Obtain third location information of an eighth symmetrical midpoint of the second pair of symmetrical facial feature points according to the third location information of each facial feature point included in the second pair of symmetrical facial feature points.

Still using the foregoing example as an example, still referring to FIG. 3E, the second pair of symmetrical facial feature points are two mouth corners I ($x_{20}$, $y_{20}$, $z_{20}$) and J ($x_{21}$, $y_{21}$, $z_{21}$), an eighth symmetrical midpoint of the second pair of symmetrical facial feature points is a midpoint of a line segment IJ formed by the points I ($x_{20}$, $y_{20}$, $z_{20}$) and J ($x_{21}$, $y_{21}$, $z_{21}$), the midpoint is tagged as L, a coordinate location of L ($x_{22}$, $y_{22}$, $z_{22}$) is obtained by using a midpoint calculation formula, and specific calculation is shown in the following formulas (31), (32) and (33):

$$x_{22} = \frac{x_{20} + x_{21}}{2} \tag{31}$$

$$y_{22} = \frac{y_{20} + y_{21}}{2} \tag{32}$$

$$z_{22} = \frac{z_{20} + z_{21}}{2} \tag{33}$$

In step 303d: Calculate a length of an eighth line segment formed by the fifth symmetrical midpoint and the sixth symmetrical midpoint according to the second location information of the fifth symmetrical midpoint and the second location information of the sixth symmetrical midpoint.

The second location information of the fifth symmetrical midpoint is K' ($x_{14}$, $y_{14}$, $z_{14}$), the second location information of the sixth symmetrical midpoint is L' ($x_{15}$, $y_{15}$, $z_{15}$), the length of the eighth line segment K'L' formed by the fifth symmetrical midpoint K' ($x_{14}$, $y_{14}$, $z_{14}$) and the sixth symmetrical midpoint L' ($x_{15}$, $y_{15}$, $z_{15}$) is a distance from the point K' ($x_{14}$, $y_{14}$, $z_{14}$) to the point L' ($x_{15}$, $y_{15}$, $z_{15}$), and is calculated by using a formula for a distance between two points, and specific calculation is shown in the following formula (34):

$$K'L' = \sqrt{(x_{15}-x_{14})^2 + (y_{15}-y_{14}+)^2(z_{15}-z_1)^2} \tag{34}$$

In step 303e: Calculate a length of a ninth line segment formed by the seventh symmetrical midpoint and the eighth symmetrical midpoint according to the third location information of the seventh symmetrical midpoint and the third location information of the eighth symmetrical midpoint.

The third location information of the seventh symmetrical midpoint is K ($x_{18}$, $y_{18}$, $z_{18}$) and the third location information of the eighth symmetrical midpoint is L ($x_{22}$, $y_{22}$, $z_{22}$), the length of the ninth line segment KL formed by the seventh symmetrical midpoint K ($x_{18}$, $y_{18}$, $z_{18}$) and the eighth symmetrical midpoint L ($x_{22}$, $y_{22}$, $z_{22}$) is a distance from the point K ($x_{18}$, $y_{18}$, $z_{18}$) to the point L ($x_{22}$, $y_{22}$, $z_{22}$), and is calculated by using a formula for a distance between two points, and specific calculation is shown in the following formula (35):

$$KL = \sqrt{(x_{18}-x_{22})^2 + (y_{18}-y_{22})^2 + (z_{18}-z_{22})^2} \tag{35}$$

In step 303f: Establish a correspondence between a third ratio of the eighth line segment to the ninth line segment and the preset face pitch angle.

Still using the foregoing example as an example, the eighth line segment is K'L', and the ninth line segment is KL, and therefore the third ratio is a ratio of K'L' to KL. A correspondence between the third ratio and the preset face pitch angle is obtained by using the following method: a face is rotated; when a facial pose angle is a preset first face pitch angle, the face is stopped from being rotating; in a case of the first face pitch angle, a ratio of K'L' to KL is calculated, to obtain a first third ratio, and a correspondence between the first third ratio and the preset first face pitch angle is stored; and the face continues to be rotated; when the facial pose angle is a preset second face pitch angle, in a case of the second face pitch angle, a ratio of K'L' to KL is calculated, to obtain a second third ratio, and a correspondence between the second third ratio and the preset second face pitch angle is stored; and the foregoing steps are repeated, until correspondences between all third ratios and preset face pitch angles are stored completely.

In step 304: Establish a correspondence between a second ratio and the preset face lateral rotation angle according to the second location information of the preset multiple facial feature points.

Figure 3F:
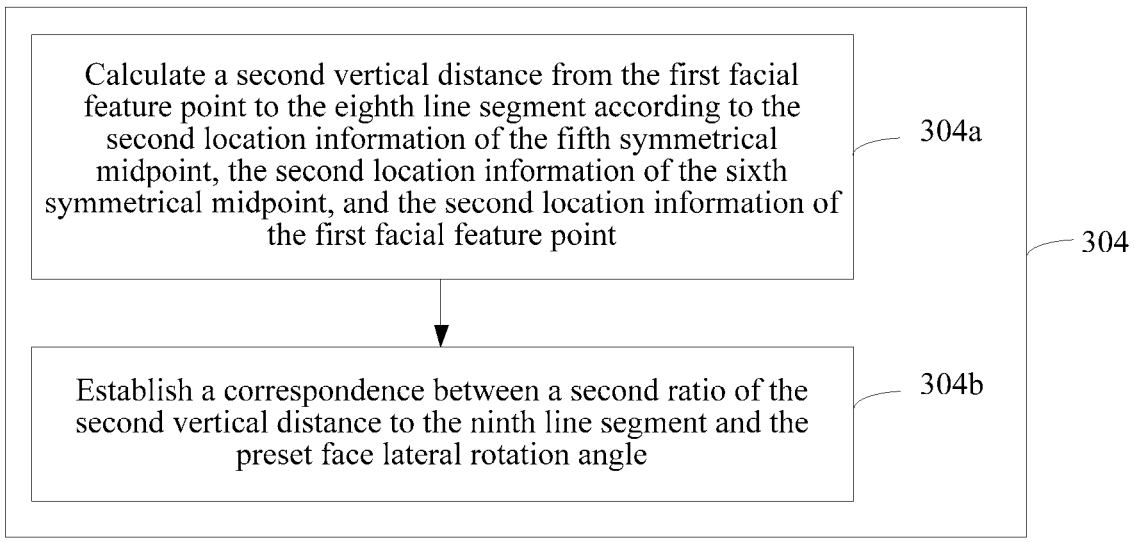
FIG. 3F is a method flowchart of a process of establishing a correspondence between a second ratio and a preset face lateral rotation angle according to an embodiment of the present technology.

The third correspondence is the correspondence between the second ratio and the preset face lateral rotation angle. Referring to FIG. 3F, FIG. 3F is a method flowchart of a process of establishing a correspondence between a second ratio and a preset face lateral rotation angle, and the method includes the following steps.

In step 304a: Calculate a second vertical distance from the first facial feature point to the eighth line segment according to the second location information of the fifth symmetrical midpoint, the second location information of the sixth symmetrical midpoint, and the second location information of the first facial feature point.

It can be learned from step 302a that, the second location information of the fifth symmetrical midpoint is K' ($x_{14}$, $y_{14}$, $z_{14}$). It can be learned from step 302b that, the second location information of the sixth symmetrical midpoint is L' ($x_{15}$, $y_{15}$, $z_{15}$). It can be learned from step 205 that, the second location information of the first facial feature point is O' ($x_{13}$, $y_{13}$, $z_{13}$), and the second vertical distance from the first facial feature point O' ($x_{13}$, $y_{13}$, $z_{13}$) to the eighth line segment K'L' is calculated by using the following process:

First, according to the second location information K' ($x_{14}$, $y_{14}$, $z_{14}$) of the fifth symmetrical midpoint and the second location information L' ($x_{15}$, $y_{15}$, $z_{15}$) of the sixth symmetrical midpoint, a straight line a passing through the point K' ($x_{14}$, $y_{14}$, $z_{14}$) and the point L' ($x_{15}$, $y_{15}$, $z_{15}$) is calculated, and specific calculation is as follows:

First, an equation of a two-point-form straight line passing through the point K' ($x_{14}$, $y_{14}$, $z_{14}$) and the point L' ($x_{15}$, $y_{15}$, $z_{15}$) is obtained according to a two-point-form straight line formula, and is shown in the following formula (36):

$$\frac{x - x_{14}}{x_{15} - x_{14}} = \frac{y + y_{14}}{y_{15} - y_{14}} \tag{36}$$

The foregoing equation is equivalently transformed, and transformed into a general straight-line equation that is shown in the following formula (37):

$$(y_{15}-y_{14})x - (x_{15}-x_{14})y + x_{15} \times y_{14} - x_{14} \times y_{15} = 0 \tag{37}$$

Certainly, the straight line a passing through the point K' ($x_{14}$, $y_{14}$, $z_{14}$) and the point L' ($x_{15}$, $y_{15}$, $z_{15}$) may be further calculated by using another method, and details are not described herein.

Then, a distance b from the first facial feature point O' ($x_{13}$, $y_{13}$, $z_{13}$) to the straight line a is calculated according to a point-to-line distance formula, and specific calculation is shown in the following formula (38):

$$b = \frac{|(y_{15}-y_{14})x_{13} - (x_{15}-x_{14})y_{13} + x_{15} \times y_{14} - x_{14} \times y_{15}|}{\sqrt{(y_{15}-y_{14})^2 + (x_{15}-x_{14})^2}} \tag{38}$$

Because the straight line a is a straight line passing through the K' ($x_{14}$, $y_{14}$, $z_{14}$) and the point L' ($x_{15}$, $y_{15}$, $z_{15}$), the distance b from the first facial feature point O' ($x_{13}$, $y_{13}$, $z_{13}$) to the straight line a is a second vertical distance from the first facial feature point O' ($x_{13}$, $y_{13}$, $z_{13}$) to the eighth line segment K'L'. Therefore, the second vertical distance is the distance b.

In step 304b: Establish a correspondence between a second ratio of the second vertical distance to the ninth line segment and the preset face lateral rotation angle.

Still using the foregoing example as an example, the second vertical distance is b, and the ninth line segment is KL, and therefore the second ratio is a ratio of b to KL. A correspondence between the second ratio and the preset face lateral rotation angle is obtained by using the following method: a face is rotated; when a facial pose angle is a preset first face lateral rotation angle, the face is stopped from being rotating; in a case of the first face lateral rotation angle, a ratio of b to KL is calculated, to obtain a first second ratio, and a correspondence between the first second ratio and the preset first face lateral rotation angle is stored; and the face continues to be rotated; when the facial pose angle is a preset second face lateral rotation angle, in a case of the second face lateral rotation angle, a ratio of b to KL is calculated, to obtain a second ratio, and a correspondence between the second ratio and the preset second face lateral rotation angle is stored; and the foregoing steps are repeated, until correspondences between all second ratios and preset face lateral rotation angles are stored completely.

Based on the above, in some embodiments, a method for determining a facial pose angle include: at a device having one or more processors and memory: while displaying a graphical user interface on a display device, capturing a first image of a human face in front of the display device; obtaining respective coordinates of a predefined set of facial feature points of the human face in the first image, wherein the predefined set of facial feature points includes an odd number of facial feature points, including at least a first pair of symmetrical facial feature points (e.g., C', D' in FIG. 2B), a second pair of symmetrical facial feature points (e.g., E', F' in FIG. 2B), and a first single facial feature point (e.g., N' in FIG. 2B), and wherein the predefined set of facial feature points are not coplanar; calculating one or more predefined key values (e.g., first ratio, second ratio, third ratio, line segments, distances, etc.) based on the respective coordinates of the predefined set of facial feature points of the human face in the first image; querying a pre-established correspondence table using the one or more predefined key values that have been calculated to determine the facial pose angle of the human face in the first image; and in accordance with a determination that the facial pose angle is a first angular value, displaying the graphical user interface in a first state (e.g., highlighting first items, scrolling in a first direction, showing items in a first orientation or viewing perspective in a 3D virtual scene); and in accordance with a determination that the facial pose angle is a second angular value, displaying the graphical user interface in a second state that is distinct from the first state (e.g., highlighting second items, scrolling in a second direction, showing items in a second orientation or viewing perspective in the 3D virtual scene).

In some embodiments, the method include: calculating an orientation difference between a horizontal plane and one of a line connecting the first pair of symmetrical facial feature points or a line connecting the second pair of symmetrical facial feature points; and determining a facial rotational angle based on the calculated orientation difference.

In some embodiments, calculating the one or more predefined key values based on the respective coordinates of the predefined set of facial feature points of the human face in the first image includes: determining a point of projection (e.g., M') from the first single facial point (e.g., N') to a line connecting a first mid-point (e.g., A') of the first pair of symmetrical facial feature points (e.g., C' and D') and a second mid-point (e.g., B') of the second pair of symmetrical facial feature points (e.g., E' and F'); calculating a first distance (e.g., distance A'M') between the point of projection and the first mid-point of the first pair of symmetrical facial feature points; calculating a second distance (e.g., distance B'M') between the point of projection and the second mid-point of the second pair of symmetrical facial feature points; calculating a first ratio (e.g., A'M'/B'M') between the first distance and the second distance; and using the first ratio between the first distance and the second distance as a first predefined key value to query the pre-established correspondence table to obtain a facial pitch angle of the human face in the first image.

In some embodiments, the first pair of symmetrical facial feature points correspond to inner corners of a pair of eyes on the human face, the second pair of symmetrical facial feature points correspond to outer corners of a mouth on the human face, and the first single facial feature point corresponds to a tip of a nose on the human face.

In some embodiments, the method to establish the correspondence table includes: obtaining a full frontal image of a three-dimensional test human face; obtaining respective images of the three-dimensional test human face at a plurality of evenly spaced facial pitch angles; calculate a base distance (e.g., distance AB) between a midpoint (e.g., A) of inner corners of a pair of eyes (e.g., C, D) on the three-dimensional test human face represented in the full frontal image and a midpoint (B) of outer corners of a mouth (e.g., E and F) on the three-dimensional test human face represented in the full frontal image; for the respective image of the three-dimensional test human face at each of the plurality of evenly spaced facial pitch angles: calculating a respective first test distance (e.g., test distance A"B") between a midpoint (e.g., A") of the inner corners of the pair of eyes (e.g., C" and D") on the three-dimensional test human face represented in the respective image and a midpoint (e.g., B") of the outer corners of the mouth (e.g., E" and F") on the three-dimensional test human face represented in the respective image; obtaining a respective first test ratio (e.g., A"B"/AB) of the respective first test distance and the base distance; adding the respective first test ratio into the pre-established correspondence table as a respective look-up ratio corresponding to said each facial pitch angle of the plurality of evenly spaced facial pitch angles.

In some embodiments, the method includes: for the respective image of the three-dimensional test human face at each of the plurality of evenly spaced facial pitch angles: calculating a respective second test distance (e.g., distance A"N") between a tip of a nose (e.g., N") and the midpoint (e.g., A") of the inner corners of the pair of eyes (e.g., C" and D") on the three-dimensional test human face represented in the respective image; calculating a respective third test distance (e.g., B"N") between the tip of the nose (e.g., N") and the midpoint (e.g., B") of the outer corners of the mouth (e.g., E" and F") on the three-dimensional test human face represented in the respective image; obtaining a respective second test ratio (e.g., A"N"/B"N") of the respective second test distance and the respective third test distance; adding the respective second test ratio (e.g., A"N"/B"N") into the pre-established correspondence table as a respective second look-up ratio corresponding to said each facial pitch angle of the plurality of evenly spaced facial pitch angles.

In some embodiments, the method include: obtaining respective images of the three-dimensional test human face at a plurality of evenly spaced facial lateral rotation angles; and, for the respective image of the three-dimensional test human face at each of the plurality of evenly spaced facial lateral rotation angles: determining a respective fourth test distance (e.g., M"N") from the tip of the nose of the three-dimensional test human face to a line (e.g., A"B") connecting the mid-point of the inner corners of the pair of eyes and the mid-point of the outer corners of the mouth on the three-dimensional test human face; calculating a respective third test ratio (e.g., M"N"/AB) between the respective fourth test distance and the base distance; and adding the respective third test ratio into the pre-established correspondence table as a respective third look-up ratio corresponding to said each facial lateral rotation angle of the plurality of evenly spaced facial lateral rotation angles.

In some embodiments, calculating the one or more predefined key values based on the respective coordinates of the predefined set of facial feature points of the human face in the first image includes: based on the facial pitch angle of the human face in the first image, a corresponding second test ratio value (e.g., A'N'/B'N') in the pre-established correspondence table, and a respective distance (e.g., distance A'B') between the first mid-point of the first pair of symmetrical facial feature points and the second mid-point of the second pair of symmetrical facial feature points in the first image, calculating the base distance; and using the ratio (e.g., M'N'/AB) between the base distance and the distance between the tip of the nose to the line connecting the mid-point of the inner corners of the pair of eyes and the mid-point of the outer corners of the mouth of the three-dimensional test human face to look up the correspondence between the respective third test ratios (e.g., M"N"/AB) in the pre-established correspondence table to determine the facial lateral rotation angle of the human face in the first image.

Other details are described in other parts of the present disclosure and can be combined with the above method without limitation in various embodiments.

To sum up, according to the method for establishing a correspondence between a line segment ratio and a preset facial pose angle provided in this embodiment of the present technology, in a three-dimensional rectangular coordinate system, a 3D model of a frontal face is rotated according to a preset angle, coordinate information of a facial feature point is obtained each time the 3D model is rotated by a preset angle, and a correspondence between a line segment ratio and a preset facial pose angle is established according to the obtained coordinate information. Because the preset angle is relatively small, the line segment ratio or the facial pose angle in the correspondence is relatively precise. Moreover, because the correspondence is pre-established, the line segment ratio or the facial pose angle may be directly obtained from the correspondence in a process of determining the facial pose angle, thereby reducing a time needed for determining the facial pose angle, and improving efficiency of determining the facial pose angle.

Apparatus embodiments of the present invention are described below, and may be used to perform the method embodiments of the present invention. For details not disclosed in the apparatus embodiments of the present invention, refer to the method embodiments of the present invention.

Figure 4:
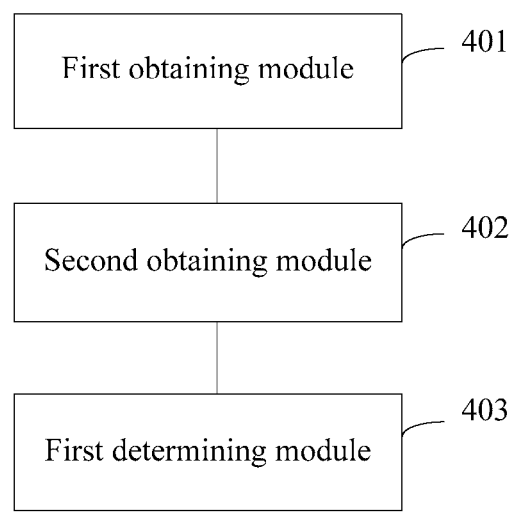
FIG. 4 is a structural block diagram of an apparatus for determining a face rotation angle according to an embodiment of the present invention.

Referring to FIG. 4, FIG. 4 is a structure block diagram of an apparatus for determining a face rotation angle according to an embodiment of the present invention. As shown in FIG. 4, the apparatus for determining a face rotation angle includes but is not limited to including: a first obtaining module 401, a second obtaining module 402, and a first determining module 403.

The first obtaining module 401 is configured to obtain first location information of preset multiple facial feature points in a to-be-determined face image, a quantity of the multiple facial feature points being an odd number, the multiple facial feature points including multiple pairs of symmetrical facial feature points and one first facial feature point, and the multiple facial feature points being not coplanar.

The second obtaining module 402 is configured to obtain, according to first location information that is of facial feature points included in each pair of facial feature points of the multiple pairs of facial feature points and that is obtained by the first obtaining module 401, first location information of a symmetrical midpoint of each pair of facial feature points.

The first determining module 403 is configured to determine a face rotation angle of the to-be-determined face image according to the first location information that is of the symmetrical midpoint of each pair of facial feature points and that is obtained by the second obtaining module 402 and first location information that is of the first facial feature point and that is obtained by the first obtaining module 401.

To sum up, according to the apparatus for determining a face rotation angle provided in this embodiment, first, preset multiple pairs of symmetrical facial feature points and one first facial feature point are obtained; according to first location information of facial feature points included in each pair of facial feature points of the multiple pairs of facial feature points, first location information of a symmetrical midpoint of each pair of facial feature points is obtained; and a preset line segment ratio is calculated according to the first location information of the symmetrical midpoint of each pair of facial feature points and first location information of the first facial feature point, a correspondence between the preset line segment ratio and a face rotation angle is queried according to the line segment ratio, and the face rotation angle of the to-be-determined face image is determined, so as to resolve the problem that the face rotation angle cannot be determined. Because the correspondence between the preset line segment ratio and the face rotation angle is a relatively precise correspondence between a line segment ratio and an angle, the method for determining a face rotation angle provided in the embodiment of the present invention improves precision of determining a face rotation angle.

In an implementation, the multiple facial feature points include five facial feature points, and the five facial feature points include a first pair of symmetrical facial feature points, a second pair of symmetrical facial feature points, and one remaining first facial feature point.

In this embodiment of the present invention, the apparatus for determining a face rotation angle may be implemented by using an electronic device. The first obtaining module 401, the second obtaining module 402, the first determining module 403, the determining and calculation module 404, the third obtaining module 405, and the establishment module 406 in the apparatus, and the sub-modules included in the modules may all be implemented by a central processing unit (CPU), a digital signal processor (DSP), a microcontroller unit (MCU), or a field-programmable gate array (FPGA) in the apparatus during actual application.

To sum up, according to the apparatus for determining a face rotation angle provided in this embodiment, first, preset multiple pairs of symmetrical facial feature points and one first facial feature point are obtained; according to first location information of facial feature points included in each pair of facial feature points of the multiple pairs of facial feature points, first location information of a symmetrical midpoint of each pair of facial feature points is obtained; and a preset line segment ratio is calculated according to the first location information of the symmetrical midpoint of each pair of facial feature points and first location information of the first facial feature point, a correspondence between the preset line segment ratio and a face rotation angle is queried according to the line segment ratio, and the face rotation angle of the to-be-determined face image is determined, so as to resolve the problem that the face rotation angle cannot be determined. Because the correspondence between the preset line segment ratio and the face rotation angle is a relatively precise correspondence between a line segment ratio and an angle, the method for determining a face rotation angle provided in the embodiment of the present invention improves precision of determining a face rotation angle.

To sum up, according to the apparatus for establishing a correspondence between a line segment ratio and a preset face rotation angle provided in this embodiment of the present invention, in a three-dimensional rectangular coordinate system, a 3D model of a frontal face is rotated according to a preset angle, coordinate information of a facial feature point is obtained each time the 3D model is rotated by a preset angle, and a correspondence between a line segment ratio and a preset face rotation angle is established according to the obtained coordinate information. Because the preset angle is relatively small, the line segment ratio or the face rotation angle in the correspondence is relatively precise. Moreover, because the correspondence is pre-established, the line segment ratio or the face rotation angle may be directly obtained from the correspondence in a process of determining the face rotation angle, thereby reducing a time needed for determining the face rotation angle, and improving efficiency of determining the face rotation angle.

It should be noted that when the apparatus for determining a face rotation angle provided in the foregoing embodiments determines a face rotation angle, description is made only through examples of division of the functional modules. In an actual application, the functions may be assigned according to needs to be implemented by different functional modules, that is, the internal structure of the electronic device is divided into different functional modules, so as to implement all or a part of the functions described above. Furthermore, the embodiment of the apparatus for determining a face rotation angle provided by the embodiments belongs to the same idea as the embodiment of the method for determining a face rotation angle, and the method embodiment may serve as a reference for details of a specific implementation process thereof, which are not repeated herein.

Figure 5:
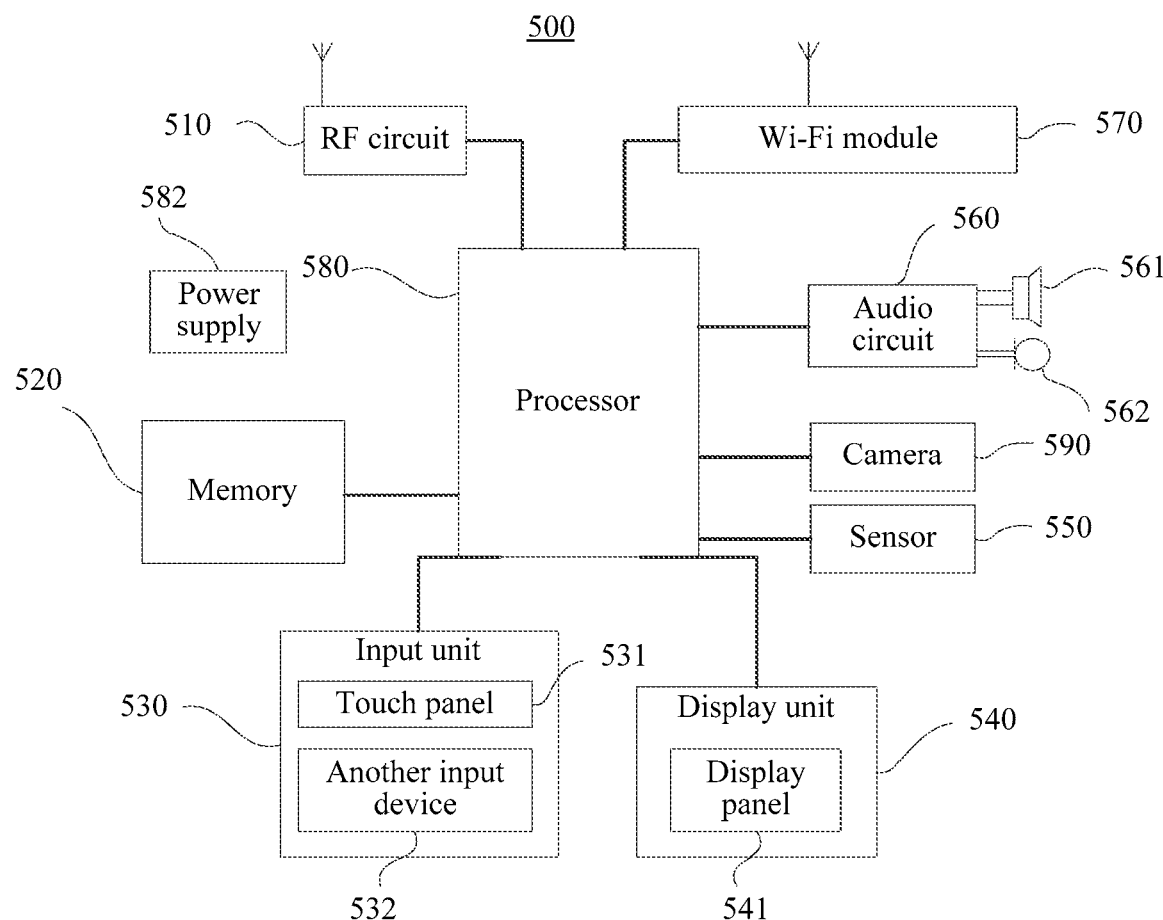
FIG. 5 is a structural block diagram of an electronic device according to some embodiments of the present technology.

Referring to FIG. 5, FIG. 5 is a structural block diagram of an electronic device according to some embodiments of the present technology. The electronic device 500 is configured to implement the service processing method provided in the foregoing embodiments. The electronic device 500 in the present disclosure may include one or more of the following components: a processor configured to execute a computer program instruction to complete various processes and methods, a random access memory (RAM) and a read only memory (ROM) that are configured to store information and a program instruction, a memory configured to store data and information, an I/O device, an interface, an antenna, or the like.

Specifically, the electronic device 500 may include components such as a radio frequency (RF) circuit 510, a memory 520, an input unit 530, a display unit 540, a sensor 550, an audio circuit 560, a Wi-Fi (Wireless-Fidelity) module 570, a processor 580, a power supply 582, and a camera 590. A person skilled in the art may understand that the structure of the electronic device shown in FIG. 5 does not constitute a limitation to the terminal, and the electronic device may include more components or fewer components than those shown in the figure, or some components may be combined, or a different component deployment may be used.

Each component part of the electronic device 500 is described below in detail with reference to FIG. 5.

The RF circuit 510 may be configured to receive and send a signal during an information receiving and sending process or a call process. Specifically, the RF circuit receives downlink information from a base station, then delivers the downlink information to the processor 580 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 510 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 520 may be configured to store a software program and module. The processor 580 runs the software program and module stored in the memory 520, to implement various functional applications and data processing of the electronic device 500. The memory 520 may mainly include a program storage area and a data storage area. The program storage area may store an operating system, an application program required by at least one function (such as a sound playback function and an image display function), and the like. The data storage area may store data (such as audio data and an address book) created according to use of the electronic device 500, and the like. In addition, the memory 520 may include a high speed random access memory, and may also include a non-volatile memory, such as at least one magnetic disk storage device, a flash memory, or another volatile solid storage device.

The input unit 530 may be configured to receive input digit or character information, and generate key signal input related to the user setting and function control of the electronic device 500. Specifically, the input unit 530 may include a touch panel 531 and another input device 532. The touch panel 531 may also be referred to as a touch screen, and may collect a touch operation of a user on or near the touch panel (such as an operation of a user on or near the touch panel 531 by using any suitable object or attachment, such as a finger or a touch pen), and drive a corresponding connection apparatus according to a preset program. Optionally, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller can receive and execute a command sent from the processor 580. In addition, the touch panel 531 may be implemented by using various types, such as a resistive type, a capacitance type, an infrared type, and a surface sound wave type. In addition to the touch panel 531, the input unit 530 may further include the another input device 532. Specifically, the another input device 532 may include, but is not limited to, one or more of a physical keyboard, a functional key (such as a volume control key or a switch key), a track ball, a mouse, a joystick, and the like.

The display unit 540 may be configured to display information input by the user or information provided for the user, and various menus of the electronic device 500. The display unit 540 may include a display panel 541. Optionally, the display panel 541 may be configured by using a liquid crystal display (LCD), an organic light-emitting diode (OLED), or the like. Further, the touch panel 531 may cover the display panel 541. After detecting a touch operation on or near the touch panel 531, the touch panel 531 transfers the touch operation to the processor 580, so as to determine a type of a touch event. Then, the processor 580 provides corresponding visual output on the display panel 541 according to the type of the touch event. Although, in FIG. 5, the touch panel 531 and the display panel 541 are used as two separate parts to implement input and output functions of the electronic device 500, in some embodiments, the touch panel 531 and the display panel 541 may be integrated to implement the input and output functions of the electronic device 500.

The electronic device 500 may further include at least one sensor 550, such as a gyroscope sensor, a magnetic induction sensor, an optical sensor, a motion sensor and another sensor. Specifically, the optical sensor may include an ambient light sensor and a proximity sensor. The ambient light sensor may adjust brightness of the display panel 541 according to brightness of ambient light. The proximity sensor may turn off the display panel 541 and/or backlight when the electronic device 500 is moved to an ear. As one type of motion sensor, an acceleration sensor may detect magnitude of accelerations at various directions (which generally are triaxial), may detect magnitude and a direction of the gravity when static, and may be configured to identify an application of an electronic device gesture (such as switchover between horizontal and vertical screens, a related game, and gesture calibration of a magnetometer), a related function of vibration identification (such as a pedometer and a knock). Other sensor, such as a barometer, a hygrometer, a thermometer, and an infrared sensor, which may be configured in the electronic device 500 are not further described herein.

The audio circuit 560, a loudspeaker 561, and a microphone 562 may provide audio interfaces between the user and the electronic device 500. The audio circuit 560 may transmit, to the loudspeaker 561, an electric signal converted from received audio data. The loudspeaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another terminal by using the RF circuit 510, or outputs the audio data to the memory 520 for further processing.

Wi-Fi belongs to a short distance wireless transmission technology. The electronic device 500 may help, by using the Wi-Fi module 570, a user to receive and send an e-mail, browse a webpage, access stream media, and the like, which provides wireless broadband Internet access for the user. Although FIG. 5 shows the Wi-Fi module 570, it may be understood that, the Wi-Fi module 570 does not belong to a necessary constitution of the electronic device 500, and can be ignored according to demands without changing the scope of the essence of the present disclosure.

The processor 580 is a control center of the electronic device 500, and connects to various parts of the entire electronic device by using various interfaces and lines. By running or executing the software program and/or module stored in the memory 520, and invoking data stored in the memory 520, the processor 180 performs various functions and data processing of the electronic device 500, thereby performing overall monitoring on the electronic device. Optionally, the processor 580 may include one or more processing units. Preferably, the processor 580 may integrate an application processor and a modem. The application processor mainly processes an operating system, a user interface, an application program, and the like. The modem mainly processes wireless communication. It may be understood that, the foregoing modem may also not be integrated into the processor 580.

The electronic device 500 further includes the power supply 582 (such as a battery) for supplying power to the components. Preferably, the power supply may logically connect to the processor 582 by using a power supply management system, thereby implementing functions, such as charging, discharging, and power consumption management, by using the power supply management system.

The camera 590 is generally formed by a lens, an image sensor, an interface, a digital signal processor, a CPU, a display screen, and the like. The lens is fixed above the image sensor, and may change focusing by manually adjusting the lens. The image sensor is equivalent to a "film" of a conventional camera, and is the heart of the camera for collecting an image. The interface is configured to connect the camera to a mainboard of the electronic device by using a flat cable and a board-to-board connector and in a spring connection manner, and send the collected image to the memory 520. The digital signal processor processes the collected image by using a mathematical operation, converts a collected analog image into a digital image, and sends the digital image to the memory 520 by using the interface.

Although not shown in the figure, the electronic device 500 may further include a Bluetooth module, and the like, which are not further described herein.

In addition to including one or more processors 580, the electronic device 500 further includes a memory, and one or more programs, where the one or more programs are stored in the memory, and are configured to be executed by the one or more processors. The one or more programs include an instruction used to execute the operations of the methods described herein.

The sequence numbers of the preceding embodiments of the present technology are merely for description purpose but do not indicate the preference of the embodiments.

In the several embodiments provided in the present application, it should be understood that the disclosed device and method may be implemented in other manners. The described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between components may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present technology may be all integrated into one processing unit, or each of the units may be separately independently used as one unit, or two or more units may be integrated into one unit. The integrated unit may be implemented in the form of hardware, or may be implemented in the form of hardware plus a software functional unit.

A person of ordinary skill in the art may understand that all or some steps for implementing the foregoing method embodiment may be completed by a program instructing related hardware, the foregoing program may be stored in a computer readable storage medium, and when being executed, the program performs steps including the foregoing method embodiment. The foregoing storage medium includes: any medium that can store program code, such as a removable storage device, a read-only memory (ROM, Read-Only Memory), a random access memory (RAM, Random Access Memory), a magnetic disk, or an optical disc.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present technology essentially, or the part contributing to the existing technology may be implemented in a form of a software product. The computer software product is stored in a storage medium and includes several instructions for instructing a computer device (which may be a personal computer, a server, a network device, or the like) to perform all or some of the methods described in the embodiments of the present technology. The foregoing storage medium includes: any media that can store program code, such as a removable storage device, a ROM, a RAM, a magnetic disk, or an optical disc.

The foregoing descriptions are merely specific embodiments of the present technology, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A method, comprising:
    at a device having one or more processors and memory:
        while displaying a graphical user interface on a display device, capturing a first image of a human face in front of the display device;
        obtaining respective coordinates of a predefined set of facial feature points of the human face in the first image, wherein the predefined set of facial feature points includes an odd number of facial feature points, including at least a first pair of symmetrical facial feature points, a second pair of symmetrical facial feature points, and a first single facial feature point, and wherein the predefined set of facial feature points are not coplanar;
        calculating one or more predefined key values based on the respective coordinates of the predefined set of facial feature points of the human face in the first image;
        querying a pre-established correspondence table using the one or more predefined key values that have been calculated to determine the facial pose angle of the human face in the first image, wherein:
            the pre-established correspondence table includes a plurality of entries, each entry having a first test ratio associated with an image of a three-dimensional test human face obtained at one of a plurality of evenly spaced facial pitch angles, the first test ratio defining a ratio of a respective first test distance and a base distance of the predefined set of facial feature points on the three-dimensional test human face at the corresponding facial pitch angle, and
            querying the pre-established correspondence table including comparing the one or more predefined key values with the first test ratios in the pre-established correspondence table to identify a corresponding one of the plurality of evenly spaced facial pitch angles as the facial pose angle of the human face in the first image; and
        in accordance with a determination that the facial pose angle is a first angular value, displaying the graphical user interface in a first state; and
        in accordance with a determination that the facial pose angle is a second angular value, displaying the graphical user interface in a second state.

2. The method of claim 1, including:
    calculating an orientation difference between a horizontal plane and one of a line connecting the first pair of symmetrical facial feature points or a line connecting the second pair of symmetrical facial feature points; and
    determining a facial rotational angle based on the calculated orientation difference.

3. The method of claim 1, wherein calculating the one or more predefined key values based on the respective coordinates of the predefined set of facial feature points of the human face in the first image includes:
    determining a point of projection from the first single facial point to a line connecting a first mid-point of the first pair of symmetrical facial feature points and a second mid-point of the second pair of symmetrical facial feature points;
    calculating a first distance between the point of projection and the first mid-point of the first pair of symmetrical facial feature points;
    calculating a second distance between the point of projection and the second mid-point of the second pair of symmetrical facial feature points;
    calculating a first ratio between the first distance and the second distance; and
    using the first ratio between the first distance and the second distance as a first key predefined key value to query the pre-established correspondence table to obtain a facial pitch angle of the human face in the first image.

4. The method of claim 3, wherein the first pair of symmetrical facial feature points correspond to inner corners of a pair of eyes on the human face, the second pair of symmetrical facial feature points correspond to outer corners of a mouth on the human face, and the first single facial feature point corresponds to a tip of a nose on the human face.

5. The method of claim 1, including:
    obtaining a full frontal image of the three-dimensional test human face;
    obtaining respective images of the three-dimensional test human face at the plurality of evenly spaced facial pitch angles;

calculating the base distance comprises calculating a distance between a midpoint of inner corners of a pair of eyes on the three-dimensional test human face represented in the full frontal image and a midpoint of outer corners of a mouth on the three-dimensional test human face represented in the full frontal image;

for the respective image of the three-dimensional test human face at each of the plurality of evenly spaced facial pitch angles:
  calculating the respective first test distance comprises calculating a distance between a midpoint of the inner corners of the pair of eyes on the three-dimensional test human face represented in the respective image and a midpoint of the outer corners of the mouth on the three-dimensional test human face represented in the respective image;
  obtaining the respective first test ratio of the respective first test distance and the base distance;
  adding the respective first test ratio into the pre-established correspondence table.

6. The method of claim 5, including:
for the respective image of the three-dimensional test human face at each of the plurality of evenly spaced facial pitch angles:
  calculating a respective second test distance between a tip of a nose and the midpoint of the inner corners of the pair of eyes on the three-dimensional test human face represented in the respective image;
  calculating a respective third test distance between the tip of the nose and the midpoint of the outer corners of the mouth on the three-dimensional test human face represented in the respective image;
  obtaining a respective second test ratio of the respective second test distance and the respective third test distance; and
  adding the respective second test ratio into the pre-established correspondence table as a respective second look-up ratio corresponding to said each facial pitch angle of the plurality of evenly spaced facial pitch angles.

7. The method of claim 6, including:
obtaining respective images of the three-dimensional test human face at a plurality of evenly spaced facial lateral rotation angles;
for the respective image of the three-dimensional test human face at each of the plurality of evenly spaced facial lateral rotation angles:
  determining a respective fourth test distance from the tip of the nose of the three-dimensional test human face to a line connecting the mid-point of the inner corners of the pair of eyes and the mid-point of the outer corners of the mouth on the three-dimensional test human face;
  calculating a respective third test ratio between the respective fourth test distance and the base distance; and
  adding the respective third test ratio into the pre-established correspondence table as a respective third look-up ratio corresponding to said each facial lateral rotation angle of the plurality of evenly spaced facial lateral rotation angles.

8. The method of claim 7, wherein calculating the one or more predefined key values based on the respective coordinates of the predefined set of facial feature points of the human face in the first image includes:
  based on the facial pitch angle of the human face in the first image, a corresponding second test ratio value in the pre-established correspondence table, and a respective distance between the first mid-point of the first pair of symmetrical facial feature points and the second mid-point of the second pair of symmetrical facial feature points in the first image, calculating the base distance; and
  using the ratio between the base distance and the distance between the tip of the nose to the line connecting the mid-point of the inner corners of the pair of eyes and the mid-point of the outer corners of the mouth of the three-dimensional test human face to look up the correspondence between the respective third test ratios in the pre-established correspondence table to determine the facial lateral rotation angle of the human face in the first image.

9. A device, comprising:
one or more processors; and
memory storing instructions, the instructions, when executed by the one or more processors, cause the processors to perform:
  while displaying a graphical user interface on a display device, capturing a first image of a human face in front of the display device;
  obtaining respective coordinates of a predefined set of facial feature points of the human face in the first image, wherein the predefined set of facial feature points includes an odd number of facial feature points, including at least a first pair of symmetrical facial feature points, a second pair of symmetrical facial feature points, and a first single facial feature point, and wherein the predefined set of facial feature points are not coplanar;
  calculating one or more predefined key values based on the respective coordinates of the predefined set of facial feature points of the human face in the first image;
  querying a pre-established correspondence table using the one or more predefined key values that have been calculated to determine the facial pose angle of the human face in the first image, wherein the pre-established correspondence table includes a plurality of entries, each entry having a first test ratio associated with an image of a three-dimensional test human face obtained at one of a plurality of evenly spaced facial pitch angles, the first test ratio defining a ratio of a respective first test distance and a base distance of the predefined set of facial feature points on the three-dimensional test human face at the corresponding facial pitch angle, and
  querying the pre-established correspondence table including comparing the one or more predefined key values with the first test ratios in the pre-established correspondence table to identify a corresponding one of the plurality of evenly spaced facial pitch angles as the facial pose angle of the human face in the first image; and
  in accordance with a determination that the facial pose angle is a first angular value, displaying the graphical user interface in a first state; and
  in accordance with a determination that the facial pose angle is a second angular value, displaying the graphical user interface in a second state.

10. The device of claim 9, wherein the processors are further configured to perform:
  calculating an orientation difference between a horizontal plane and one of a line connecting the first pair of symmetrical facial feature points or a line connecting the second pair of symmetrical facial feature points; and determining a facial rotational angle based on the calculated orientation difference.

11. The device of claim 9, wherein calculating the one or more predefined key values based on the respective coordinates of the predefined set of facial feature points of the human face in the first image includes:

determining a point of projection from the first single facial point to a line connecting a first mid-point of the first pair of symmetrical facial feature points and a second mid-point of the second pair of symmetrical facial feature points;

calculating a first distance between the point of projection and the first mid-point of the first pair of symmetrical facial feature points;

calculating a second distance between the point of projection and the second mid-point of the second pair of symmetrical facial feature points;

calculating a first ratio between the first distance and the second distance; and using the first ratio between the first distance and the second distance as a first key predefined key value to query the pre-established correspondence table to obtain a facial pitch angle of the human face in the first image.

12. The device of claim 11, wherein the first pair of symmetrical facial feature points correspond to inner corners of a pair of eyes on the human face, the second pair of symmetrical facial feature points correspond to outer corners of a mouth on the human face, and the first single facial feature point corresponds to a tip of a nose on the human face.

13. The device of claim 9, wherein the processors are further configured to perform:

obtaining a full frontal image of the three-dimensional test human face;

obtaining respective images of the three-dimensional test human face at the plurality of evenly spaced facial pitch angles;

calculating the base distance comprises calculating a distance between a midpoint of inner corners of a pair of eyes on the three-dimensional test human face represented in the full frontal image and a midpoint of outer corners of a mouth on the three-dimensional test human face represented in the full frontal image;

for the respective image of the three-dimensional test human face at each of the plurality of evenly spaced facial pitch angles:

calculating the respective first test distance comprises calculating a distance between a midpoint of the inner corners of the pair of eyes on the three-dimensional test human face represented in the respective image and a midpoint of the outer corners of the mouth on the three-dimensional test human face represented in the respective image;

obtaining the respective first test ratio of the respective first test distance and the base distance;

adding the respective first test ratio into the pre-established correspondence table.

14. The device of claim 13, wherein the processors are further configured to perform:

for the respective image of the three-dimensional test human face at each of the plurality of evenly spaced facial pitch angles:

calculating a respective second test distance between a tip of a nose and the midpoint of the inner corners of the pair of eyes on the three-dimensional test human face represented in the respective image;

calculating a respective third test distance between the tip of the nose and the midpoint of the outer corners of the mouth on the three-dimensional test human face represented in the respective image;

obtaining a respective second test ratio of the respective second test distance and the respective third test distance; and adding the respective second test ratio into the pre-established correspondence table as a respective second look-up ratio corresponding to said each facial pitch angle of the plurality of evenly spaced facial pitch angles.

15. The device of claim 14, wherein the processors are further configured to perform:

obtaining respective images of the three-dimensional test human face at a plurality of evenly spaced facial lateral rotation angles;

for the respective image of the three-dimensional test human face at each of the plurality of evenly spaced facial lateral rotation angles:

determining a respective fourth test distance from the tip of the nose of the three-dimensional test human face to a line connecting the mid-point of the inner corners of the pair of eyes and the mid-point of the outer corners of the mouth on the three-dimensional test human face;

calculating a respective third test ratio between the respective fourth test distance and the base distance; and adding the respective third test ratio into the pre-established correspondence table as a respective third look-up ratio corresponding to said each facial lateral rotation angle of the plurality of evenly spaced facial lateral rotation angles.

16. The device of claim 15, wherein calculating the one or more predefined key values based on the respective coordinates of the predefined set of facial feature points of the human face in the first image includes:

based on the facial pitch angle of the human face in the first image, a corresponding second test ratio value in the pre-established correspondence table, and a respective distance between the first mid-point of the first pair of symmetrical facial feature points and the second mid-point of the second pair of symmetrical facial feature points in the first image, calculating the base distance; and using the ratio between the base distance and the distance between the tip of the nose to the line connecting the mid-point of the inner corners of the pair of eyes and the mid-point of the outer corners of the mouth of the three-dimensional test human face to look up the correspondence between the respective third test ratios in the pre-established correspondence table to determine the facial lateral rotation angle of the human face in the first image.

17. A non-transitory computer-readable storage medium storing instructions, the instructions, when executed by one or more processors, cause the processors to perform:

while displaying a graphical user interface on a display device, capturing a first image of a human face in front of the display device;

obtaining respective coordinates of a predefined set of facial feature points of the human face in the first image, wherein the predefined set of facial feature points includes an odd number of facial feature points, including at least a first pair of symmetrical facial feature points, a second pair of symmetrical facial feature points, and a first single facial feature point, and wherein the predefined set of facial feature points are not coplanar;

calculating one or more predefined key values based on the respective coordinates of the predefined set of facial feature points of the human face in the first image;

querying a pre-established correspondence table using the one or more predefined key values that have been calculated to determine the facial pose angle of the human face in the first image, wherein:

the pre-established correspondence table includes a plurality of entries, each entry having a first test ratio associated with an image of a three-dimensional test human face obtained at one of a plurality of evenly spaced facial pitch angles, the first test ratio defining a ratio of a respective first test distance and a base distance of the predefined set of facial feature points on the three-dimensional test human face at the corresponding facial pitch angle, and querying the pre-established correspondence table including comparing the one or more predefined key values with the first test ratios in the pre-established correspondence table to identify a corresponding one of the plurality of evenly spaced facial pitch angles as the facial pose angle of the human face in the first image; and in accordance with a determination that the facial pose angle is a first angular value, displaying the graphical user interface in a first state; and in accordance with a determination that the facial pose angle is a second angular value, displaying the graphical user interface in a second state.

18. The non-transitory computer-readable storage medium of claim 17, wherein the processors are further configured to perform:

calculating an orientation difference between a horizontal plane and one of a line connecting the first pair of symmetrical facial feature points or a line connecting the second pair of symmetrical facial feature points; and determining a facial rotational angle based on the calculated orientation difference.

19. The non-transitory computer-readable storage medium of claim 17, wherein calculating the one or more predefined key values based on the respective coordinates of the predefined set of facial feature points of the human face in the first image includes:

determining a point of projection from the first single facial point to a line connecting a first mid-point of the first pair of symmetrical facial feature points and a second mid-point of the second pair of symmetrical facial feature points;

calculating a first distance between the point of projection and the first mid-point of the first pair of symmetrical facial feature points;

calculating a second distance between the point of projection and the second mid-point of the second pair of symmetrical facial feature points;

calculating a first ratio between the first distance and the second distance; and using the first ratio between the first distance and the second distance as a first key predefined key value to query the pre-established correspondence table to obtain a facial pitch angle of the human face in the first image.

20. The non-transitory computer-readable storage medium of claim 19, wherein the first pair of symmetrical facial feature points correspond to inner corners of a pair of eyes on the human face, the second pair of symmetrical facial feature points correspond to outer corners of a mouth on the human face, and the first single facial feature point corresponds to a tip of a nose on the human face.

* * * * *